United States Patent
Grappone

(12) 
(10) Patent No.: US 6,381,506 B1
(45) Date of Patent: Apr. 30, 2002

(54) FAIL-SAFE MICROPROCESSOR-BASED CONTROL AND MONITORING OF ELECTRICAL DEVICES

(76) Inventor: Victor Grappone, 9 Albert Rd., Hicksville, NY (US) 11801

( * ) Notice: Subject to any disclaimer, the term of this patent is extended or adjusted under 35 U.S.C. 154(b) by 0 days.

(21) Appl. No.: 09/274,523

(22) Filed: Mar. 23, 1999

Related U.S. Application Data

(63) Continuation-in-part of application No. 08/757,444, filed on Nov. 27, 1996, now abandoned.

(51) Int. Cl.⁷ .......................... G05B 11/01; G05B 9/02; G06F 11/00; H02H 3/00
(52) U.S. Cl. ........................... 700/79; 700/12; 326/14; 714/735; 714/736; 361/1
(58) Field of Search ................. 700/11, 12, 17, 700/18, 79–82; 714/715, 716, 735, 736, 738, 744; 326/9, 14; 361/1, 824

(56) References Cited

U.S. PATENT DOCUMENTS

| | | | | |
|---|---|---|---|---|
| 2,500,615 A | | 3/1950 | Martin ........................ 361/205 |
| 3,491,302 A | | 1/1970 | Madsen et al. ................ 326/14 |
| 3,569,730 A | | 3/1971 | Wetmore ....................... 326/9 |
| 3,582,644 A | | 6/1971 | Schatzel ................. 246/34 CT |
| 3,748,540 A | | 7/1973 | Eggenberger et al. ...... 361/170 |
| 3,751,679 A | | 8/1973 | Rotier .......................... 326/11 |
| 3,781,541 A | | 12/1973 | Darrow et al. .............. 246/128 |
| 3,909,632 A | | 9/1975 | Sibley .......................... 326/14 |
| 3,913,023 A | | 10/1975 | Dolch .......................... 326/14 |
| 3,992,698 A | | 11/1976 | Sahasrabudhe et al. 340/825.58 |
| 4,013,951 A | * | 3/1977 | Ezoe et al. .................. 714/744 |
| 4,097,764 A | * | 6/1978 | Sibley ......................... 326/14 |
| 4,222,086 A | | 9/1980 | Runyon ..................... 361/93.6 |
| 4,231,073 A | | 10/1980 | Suchko ........................... 361/1 |
| 4,280,164 A | * | 7/1981 | Kozek ........................ 361/179 |
| 4,320,881 A | | 3/1982 | Campbell ................. 246/34 B |
| 4,398,233 A | * | 8/1983 | Bala et al. ..................... 361/78 |
| 4,405,033 A | * | 9/1983 | Elliot, Jr. et al. ........... 181/120 |
| 4,422,067 A | | 12/1983 | Clark et al. ................. 340/508 |
| 4,639,919 A | * | 1/1987 | Chang et al. ................ 714/743 |
| 4,682,153 A | * | 7/1987 | Boozer et al. ............... 340/507 |
| 4,120,270 A | * | 10/1987 | Asano et al. .................. 123/32 |
| 4,701,918 A | * | 10/1987 | Nakajima et al. ........... 714/724 |
| 5,422,808 A | * | 10/1987 | Catanese, Jr. et al. ......... 700/79 |
| 4,745,542 A | * | 5/1988 | Baba et al. .................... 700/79 |
| 4,827,396 A | * | 5/1989 | Taniguchi ..................... 700/25 |
| 5,021,683 A | * | 6/1991 | Schemmel .................... 326/10 |
| 5,170,343 A | * | 12/1992 | Matsuda ....................... 700/79 |
| 5,241,550 A | * | 8/1993 | Kusano ....................... 714/824 |
| 5,243,606 A | * | 9/1993 | Sugita et al. ............... 714/822 |
| 5,339,237 A | | 8/1994 | Mody et al. ................... 700/79 |
| 5,381,418 A | * | 1/1995 | Montoye .................... 714/719 |
| 5,428,769 A | | 6/1995 | Glaser et al. ................... 700/4 |
| 5,438,237 A | * | 8/1995 | Mullins et al. ................ 315/82 |

* cited by examiner

*Primary Examiner*—William Grant
*Assistant Examiner*—Paul Rodriguez
(74) *Attorney, Agent, or Firm*—Abelman, Frayne & Schwab

(57) ABSTRACT

A fail-safe microprocessor-based system and method permits the controlling and monitoring of electrical devices for use in fail-safe interfacing of electrical devices to microprocessor-based control equipment in applications that are highly safety-critical. Such devices as relays, lamps, motors, contactors, pushbuttons, limit switches, solenoids and the like are monitored and controlled using codes. These functions are performed by standard, "off-the-shelf" microprocessor-based systems that are not ordinarily employed in or configured for such safety-critical applications. The fail-safe system provides for sufficiently fail-safe checking for such systems to be rendered highly reliable. The fail-safe system monitors or controls a device having at least first and second contacts, with the fail-safe system having a processor which operates using a program for generating an input signal, for applying the input signal to the first contact, for detecting a response signal at the second contact, and for comparing the response signal with the input signal to monitor the operational condition of the device or to control the device.

27 Claims, 15 Drawing Sheets

FIG. 3

CASE: A
PRIMARY POSITIVE CHECK GOOD
PRIMARY NEGATIVE CHECK GOOD

GENERATED CODE

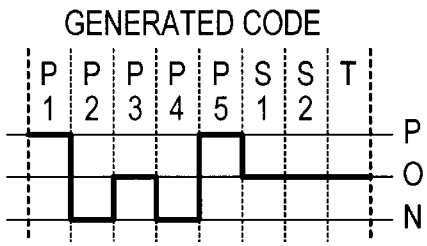

DETECTED CODE

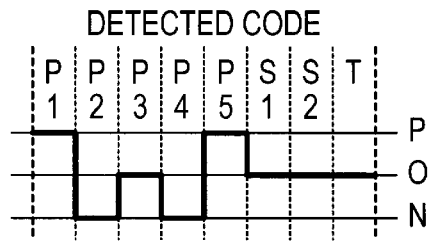

CASE: B

PRIMARY POSITIVE CHECK GOOD
PRIMARY NEGATIVE CHECK FAILED AND ASSIGNED SECONDARY CODE
WINDOW S1 WITH CHECK GOOD

GENERATED CODE

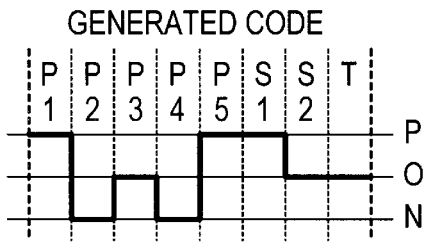

DETECTED CODE

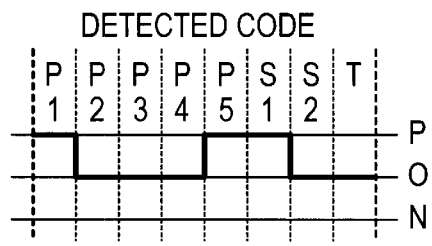

CASE: C
PRIMARY NEGATIVE CHECK GOOD
PRIMARY POSITIVE CHECK FAILED AND ASSIGNED SECONDARY CODE
WINDOW S2 WITH CHECK GOOD

GENERATED CODE

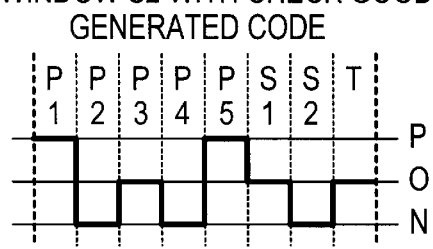

DETECTED CODE

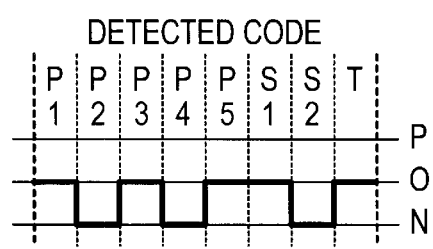

CASE: D
PRIMARY POSITIVE CHECK GOOD
PRIMARY NEGATIVE CHECK FAILED, NOT ASSIGNED TO SECONDARY
CODE WINDOW
TERTIARY WINDOW ACTIVATED WITH CHECK GOOD

GENERATED CODE

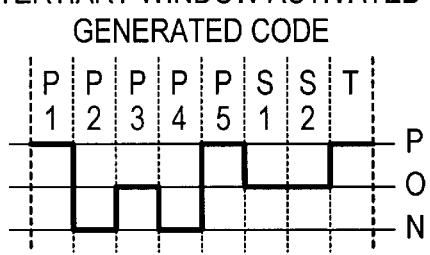

DETECTED CODE

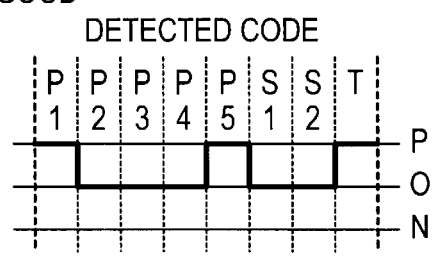

FIG. 4

CASE: A
PRIMARY POSITIVE CHECK GOOD
PRIMARY NEGATIVE CHECK GOOD

GENERATED CODE

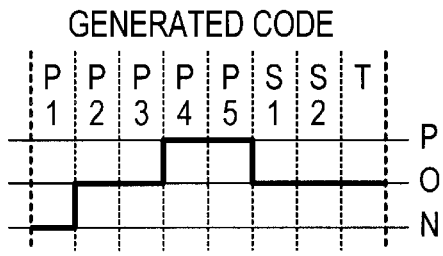

DETECTED CODE

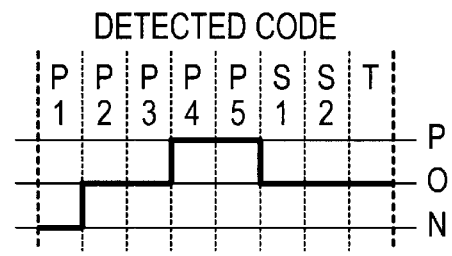

CASE: B
PRIMARY NEGATIVE CHECK GOOD
PRIMARY POSITIVE CHECK FAILED AND ASSIGNED SECONDARY CODE WINDOW S1 WITH CHECK GOOD

GENERATED CODE

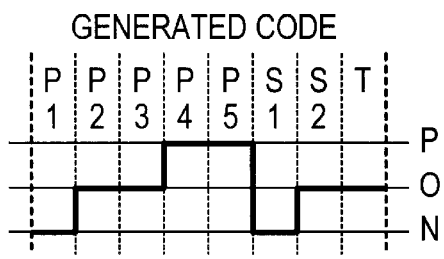

DETECTED CODE

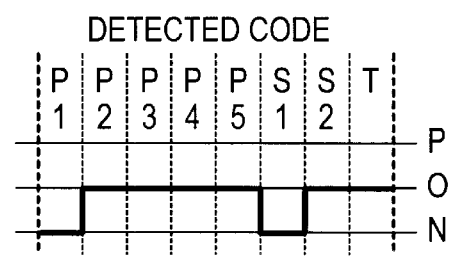

CASE: C
PRIMARY POSITIVE CHECK GOOD
PRIMARY NEGATIVE CHECK FAILED AND ASSIGNED SECONDARY CODE WINDOW S2 WITH CHECK GOOD

GENERATED CODE

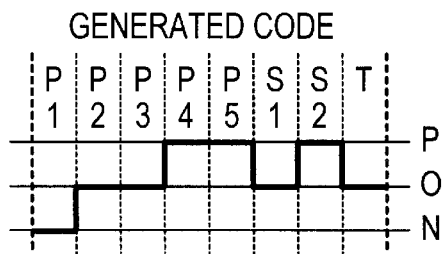

DETECTED CODE

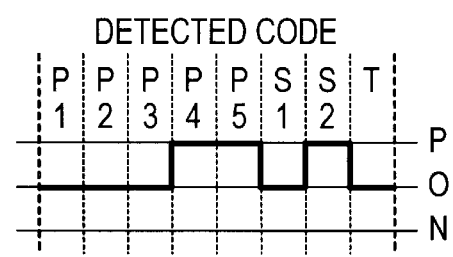

CASE: D
PRIMARY NEGATIVE CHECK GOOD
PRIMARY POSITIVE CHECK FAILED, NOT ASSIGNED TO SECONDARY CODE WINDOW
TERTIARY WINDOW ACTIVATED WITH CHECK GOOD

GENERATED CODE

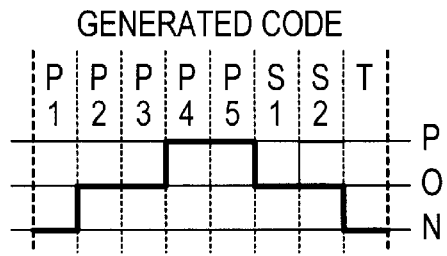

DETECTED CODE

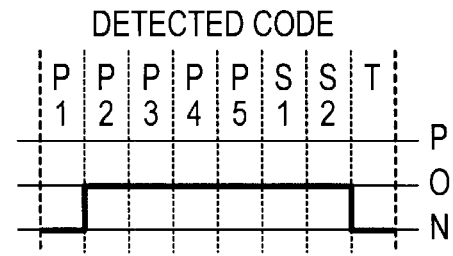

FIG. 5
SECONDARY WINDOWS ARE ASSUMED NOT ASSIGNED
ONLY GENERATED CODES SHOWN
CASE: A
STATUS CODE 1: P-N-O-N-P
PRIMARY POSITIVE CHECK FAILED, PRIMARY NEGATIVE CHECK GOOD
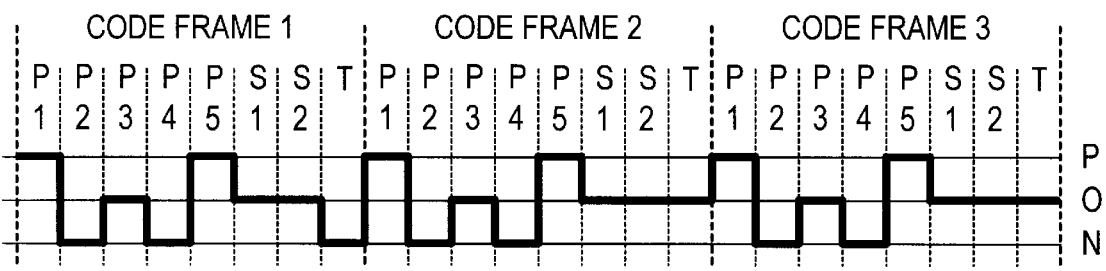
CASE: B
STATUS CODE 2: N-N-O-P-O
PRIMARY POSITIVE CHECK FAILED, PRIMARY NEGATIVE CHECK GOOD
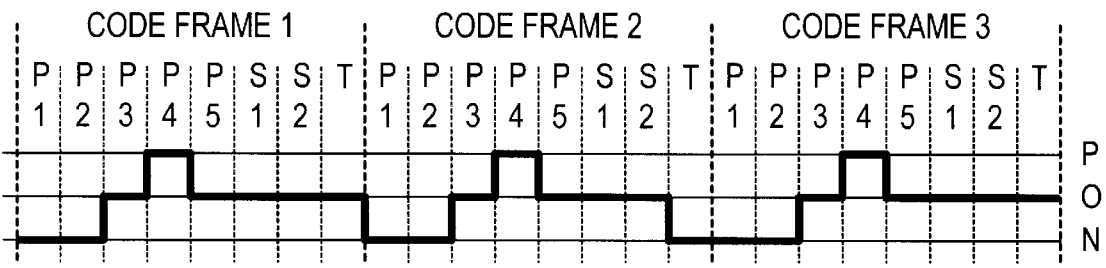
CASE: C
STATUS CODE 3: N-P-N-N-P
PRIMARY POSITIVE CHECK FAILED, PRIMARY NEGATIVE CHECK GOOD
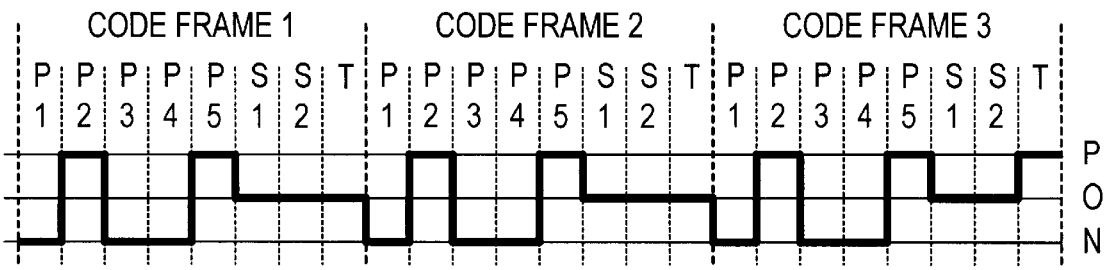

FIG. 12

FIG. 12 (CON'T)

FAIL-SAFE MICROPROCESSOR-BASED CONTROL AND MONITORING OF ELECTRICAL DEVICES

CROSS-REFERENCE TO RELATED APPLICATION

This is a continuation-in-part of U.S. application No. 08/757,444, filed on Nov. 27, 1996 now abandoned.

BACKGROUND INFORMATION

1.1A Technical Field

This disclosure relates to fail-safe systems, and in particular to a microprocessor-based system and method for providing fail-safe-control and monitoring of devices.

1.1B Description of the Related Art

Many critical applications of monitoring and control systems require that their operation be fail-safe in order to avoid human injury and property damage. To achieve this, the behavior of these systems are, under all possible conditions, to be predictable to an extremely high level of certainty. The fail-safety of such systems that employ electronic components has been the subject of considerable concern and study. A major source of this concern is the fact that electronic components typically exhibit failure modes that are random and unpredictable. A transistor, for example, either may fail electrically by being open-circuited or short-circuited. A device controlled by such a transistor may therefore fail in a state that is at best, undesired, or at worst, unsafe. Similarly, a failed component in a monitoring circuit acting as an input to a system may cause the system to operate with the input device in the state opposite to its actual state, which may result in unsafe operation.

A second potential source of unsafe system operation relates to the physical interconnection of input and output devices to a microprocessor-based controller that monitors and/or controls them. If the wires that connect to the devices are installed improperly, or if they come in improper contact with each other, the inputs being monitored may be misread or the outputs being controlled may attain an unsafe state.

In the design of control systems, techniques aimed at providing fail-safety by reducing the probability of wrong-side failures tend to increase complexity. This often results in reduced reliability because of the likelihood that one of the added components may fail. Therefore, a trade-off relationship often exists between fail-safety and reliability in that concepts intended to enhance one tend to compromise the other.

The illustrative embodiments of the hardware and programming specified herein address both of the above-mentioned problems of the prior art to provide completely fail-safe systems, and also address the problem of maintaining a high level of reliability.

Accordingly, I have invented a fail-safe system and method which use readily available, generic microprocessor-based equipment that, individually, are not inherently designed to be fail-safe.

SUMMARY

A fail-safe system is disclosed for monitoring or controlling a device having at least first and second contacts, with the fail-safe system having a processor which operates using a program for generating an input signal, for applying the input signal to the first contact, for detecting a response signal at the second contact, and for comparing the response signal with the input signal to monitor the operational condition of the device, or to control the device.

In particular, the fail-safety of the overall system is secured by the interaction of specific hardware and programs such that each supports the other in a synergistic manner.

BRIEF DESCRIPTION OF THE DRAWINGS

The features of the disclosed fail-safe control system and method will become more readily apparent and may be better understood by referring to the following detailed description of illustrative embodiments of the present invention, taken in conjunction with the accompanying drawings, in which:

FIG. 3 depicts a set of timing diagrams corresponding to a first device monitoring code;

FIG. 4 depicts a set of timing diagrams corresponding to a second device monitoring code;

FIG. 5 depicts a set of timing diagrams illustrating secondary and tertiary codes;

FIG. 12 depicts a set of timing diagrams illustrating device control check cycle sequencing and utilization.

DESCRIPTION OF THE PREFERRED EMBODIMENTS

Figure 1A:
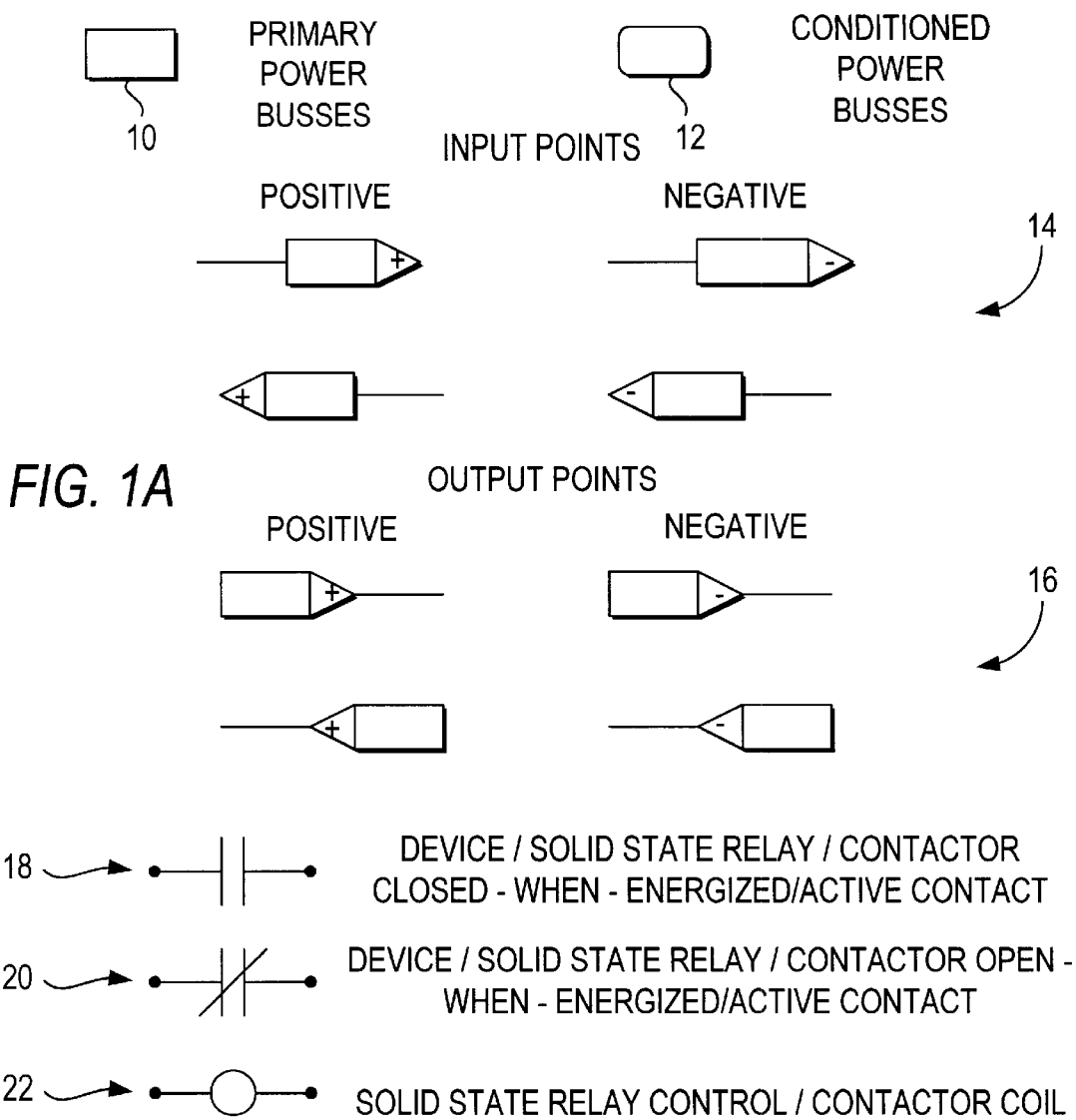
FIG. 1A illustrates a set of schematic symbols which are utilized to represent the various components in the detailed description of the invention.

Referring now in specific detail to the drawings, with like reference numerals identifying similar or identical elements, various schematic symbols of elements used throughout the drawings are shown in FIG. 1A. For example, primary power busses 10 are represented by rectangular boxes, while conditioned power busses 12 are represented by boxes with rounded corners. Input points 14 and output points 16 may be either positive or negative. Device or solid state relay or contactor contacts 18 and 20 are closed-when-energized and open-when-energized, respectively. Solid state relay controls or contactor coils 22 are also shown.

1.2: DEFINITIONS

Definitions of terms as referenced herein are as follows.

Discrete Failure: an isolated failure of a specific component or program calculation.

Systemic Failure: a failure or combination of failures that results in a loss of system functionality.

Wrong-Side Failure: a systemic failure that results in an unsafe condition.

Right-Side Failure: a systemic failure that results in a safe condition.

Fail-Safety: the degree to which a system is immune to wrong-side failures.

Reliability: the degree to which a system is immune to both right-side and wrong-side failures.

Microprocessor-Based Controller (MBC): a microprocessor-based system which monitors and controls electrical devices in accordance with a user-defined program.

Device: an apparatus which is to be monitored or controlled in a fail-safe manner.

Hardware Design: an embodiment of an arrangement and interconnection of a microprocessor-based controller, the devices its controls and/or monitors, and other electrical components which, in conjunction with an operating program of the controller, ensures fail-safety and reliability.

Software: the computer programming environment in which the structure of the modular sequences of instructions that includes an executive program, and the logic that includes an application program are defined and enforced.

Application Program: the user-definable set of instructions that are executed by a microprocessor-based controller, the purpose of which is to perform the site-specific functional logic used by the application of a system.

Executive Program: the non-user-definable, modular sequences of instructions that are executed by a microprocessor-based controller, the purpose of which is, in conjunction with the hardware design, to ensure fail-safety and reliability.

Input Point: an interface point in a microprocessor-based controller that detects the presence or absence of electrical energy and attains a corresponding binary state, either on or off, thereby providing a monitoring capability. Input points may be either positive or negative, depending upon the polarity of the energy to be detected.

Output Point: an interface point in a microprocessor-based controller that switches electrical energy either on or off depending on the logic defined by the system's program, to provide it with control capabilities. Output points may be either positive or is negative, depending upon the polarity of the energy which the output points switch.

Calculated Point: A point internal to an MBC whose state is dependent on its program.

1.3: AREAS OF APPLICATION

Areas of application for systems as specified herein include, but are not necessarily be limited to, the following:

Railroad and Rail Mass Transit Signaling;

Highway Traffic Signaling;

Elevator Control;

Electric Power Plant Control;

Electric Power Switching;

Petrochemical Factory Production Processes;

Water Supply Chemical Treatment; and

Hazardous Factory Processes.

1.4: MBC CONFIGURATION

Figure 1B:
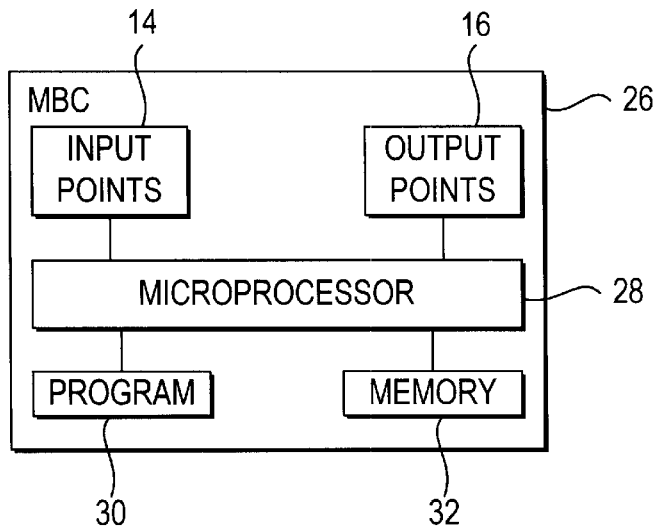
FIG. 1B depicts the general configuration of a microprocessor-based controller (MBC)

FIG. 1B illustrates the configuration of the MBC's 26 upon which the disclosed fail-safe system is based. Each MBC 26 includes a microprocessor 28, a program 30 for performing the method using the microprocessor 28, and a memory 32 for storing a program 30 and/or operating parameters for use by the microprocessor 28 to operate as a fail-safe controller and monitor of electrical devices. The MBC 26 also includes a plurality of output points 14 and a plurality of input points 38 for fail-safe embodiments and monitoring of the devices as described and shown in the following description.

For clarity of explanation, the illustrative embodiments of the disclosed fail-safe system and method are presented as having individual functional blocks, which may include functional blocks labelled as "MBC" and "microprocessor". The functions represented by these blocks may be provided through the use of either shared or dedicated hardware, including, but not limited to, hardware capable of executing software. For example, the functions of the MBC 26 and microprocessor 28 presented herein may be provided by a shared processor or by a plurality of individual processors. Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

In an illustrative embodiment, the MBC 26 may be a programmable logic controller (PLC) such as PLCs known in the art and commercially available, such as PLCs available through General Electric. It is understood that other MBC's may be used, such as those MBC's which are INTEL-based devices including, for example, the INTEL 80386EX microprocessor. The microprocessor 28 runs application and/or executive software as the program 30 which may be generated using relay ladder logic known in the art. It is understood that one skilled in the art would be able to use other programming languages such as C++, assembly language or microcontroller-oriented instructions to implement the disclosed fail-safe system and method, as described herein.

The microprocessor 28 receives commands and input data from user through the input device (not shown in FIG. 1B) which includes a keyboard, a mouse, and/or a data reading device such as a disk drive for receiving the data in input data files from storage media such as a floppy disk or an 8 mm storage tape. Through the input device, the user may select commands using the mouse in conjunction with a graphic user interface and/or a display.

The microprocessor 28, executing program 30 which may be a set of subroutines, generates and confirms diagnostic routines that, together with the hardware designs and embodiments thereof, ensure fail-safe device operation. These routines are modularized so that all devices of the same type are subjected to the same checks in a manner such that they cannot be modified, overridden or eliminated by system users. This executive modular logic is enforced by software implementing the disclosed fail-safe method, which provides a high-level programming environment in which specific instances of devices to be monitored and/or controlled are defined for the system. Once this is done, the checks for each type of device are automatically generated in a manner transparent to and beyond the control of users to provide the mechanism by which the above-mentioned executive logic is enforced.

The software also provides the environment by which the site-specific application logic for the system is defined. This programming, in contrast to the executive logic, is user-definable so that systems may be programmed for application-specific functionality.

A distinct set of illustrative embodiments for hardware designs and programs applied to the fail-safe monitoring of field devices are presented in Section 2 below. Further distinct sets of illustrative embodiments for hardware designs and programs applied to the fail-safe control of field devices are presented in Section 3 below. The disclosed illustrative embodiments cover the control of devices whose safe state is "off" and those whose safe state is "on".

2.1: DEVICE MONITORING

The purpose of the illustrative embodiments disclosed herein is to monitor the status of devices in a manner which is both fail-safe and reliable. In an illustrative embodiment, all field devices to be monitored are provided unpowered "dry" electrical contacts, the open or closed state of which reflect actual field conditions. Furthermore, the closed state of these contacts corresponds to the "active" state of the device which is to be detected positively to ensure fail-safety. This results in the condition that it would be a wrong-side failure if a contact that was actually open was interpreted to be closed, and conversely it would be a right-side failure if a contact that was actually closed was interpreted to be open. In an illustrative embodiment, the devices provide two such contacts that operate independently of each other.

2.2: THEORY

Each of the two device contacts is monitored independently, and the checks described below are to be satisfied for both device contacts before the device is considered to be in the active state.

For each device contact, an electrical signal is generated providing a series of carefully timed direct current pulses that define a unique "Code" for that particular monitored circuit. The codes are defined by the presence or absence of these pulses during predefined intervals of time called "windows". Each pulse may be either positive or negative in polarity, resulting in the possibility of three distinct states for each code window: positive (P), negative (N) or off (O). This signal, having been routed through the device contact, is then detected, and interpreted in comparison to the code originally generated. The unique codes include a specific number of pulses includes combinations of the three states, which constitute a "Primary Code". This number of pulses is called the "Primary Code Length".

Due to the possibility of a given input or output point failing in either the on or off state, all valid primary codes are to include at least one P window and one N window for providing a check on the operation of both the positive and negative input/output point pairs. The number of possible unique primary codes increases greatly as the primary code length is increased. Accordingly, the number of monitoring circuits utilized for a given application determines the primary code length to be applied.

The primary code is detected and, if verified as being correct, the corresponding field contact may be safely interpreted as being closed. This is true because the primary code checks may only be successful if the correct code had been generated, routed through the correct device contact, and properly detected. This, however, has all four points (positive and negative and output) be operational. In the event of a failure of one or more of these, both "Secondary Codes" and "Tertiary Codest" are provided to maintain the monitoring function and thereby provide increased reliability.

2.3: HARDWARE DESIGN AND ILLUSTRATIVE EMBODIMENTS THEREOF

Figure 1C:
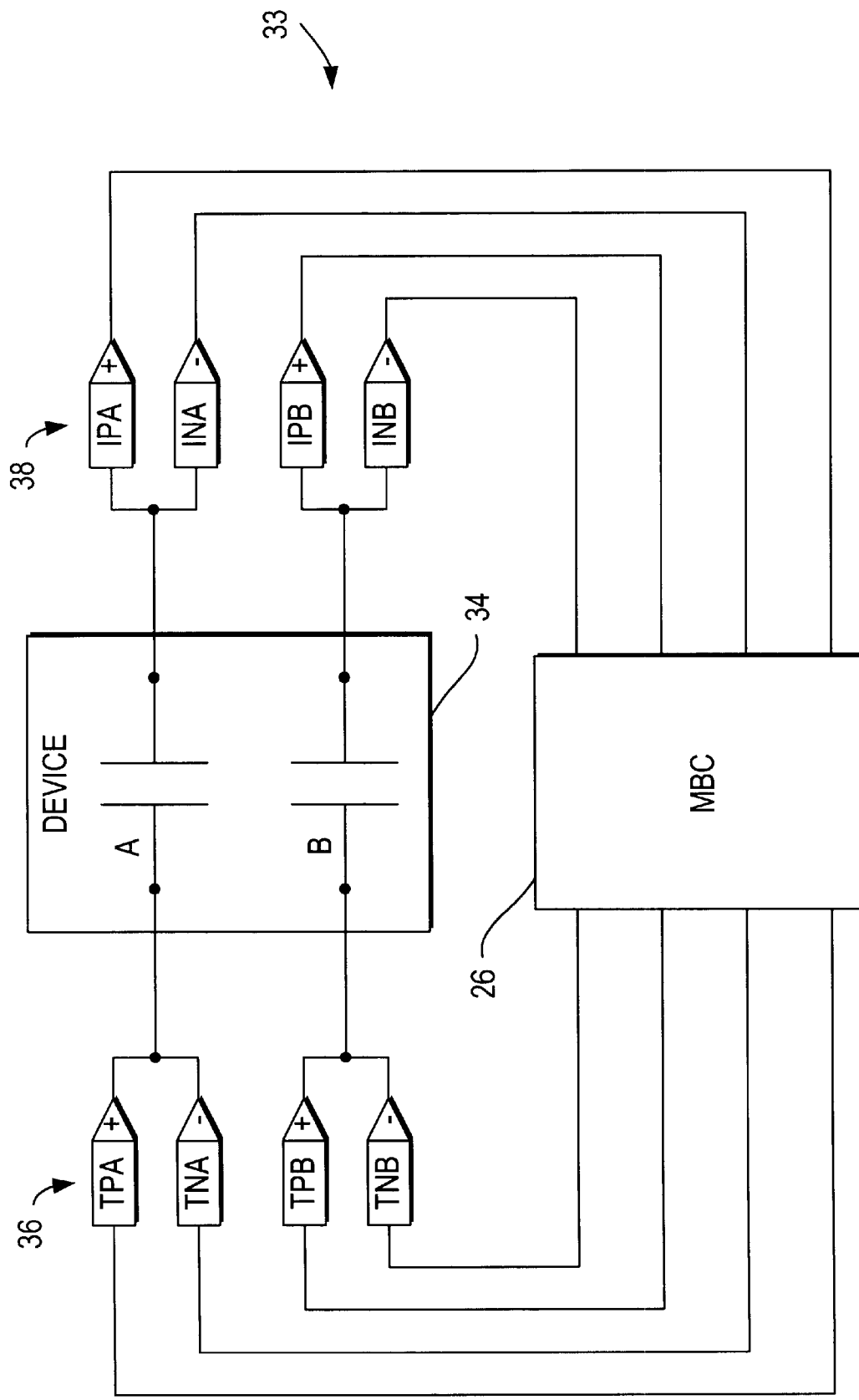
FIG. 1C is a schematic diagram of the disclosed fail-safe system configured for device monitoring.

In an illustrative embodiment, a typical monitoring circuit is shown in FIG. 1C. A configuration 33 is shown in FIG. 1C having the MBC 26 connected to a device 34 with two distinct sets of contacts, with labels distinguished by A and B, respectively, via output points 36 and input points 38. The device is capable of positively indicating distinct field conditions. If the condition is true, contacts A and B are closed.

The basic concept behind the interface for status monitoring is that each circuit is originated at two output points of the MBC, one positive and one negative. These points serve the function of producing the pulses that form the codes described in section 2.2. These are, in turn, routed through device contacts and returned to two MBC input points, again one positive and one negative, which detect the pulses. When the condition is true, a circuit is completed from output points TPA and TNA through contact A to input points IPA and INA. Concurrently, a second similar circuit is completed from input points TPB and TNB through contact B to points IPB and INB.

2.4: EXECUTIVE PROGRAM

The executive program serves the function of generating the unique codes and applying them to specific output points, detecting the codes returned to the input points, and interpreting them in ensuring fail-safety and reliability.

2.4.1: CODE STRUCTURE

The executive program generates the codes by defining a "Code Frame" in time including several "Code Windows". This defines the framework or template upon which the timing of all codes is based. The number of windows per frame is equal to the primary code length referenced in section 2.2, plus a number of secondary codes, plus one for a tertiary code. The number of windows in a code frame may therefore vary in accordance with particular application operating parameters. A large number allows that many different devices may be monitored because many code combinations are available with a corresponding response rate related to the length of the code. Conversely, a small number limits the number of unique devices that may be monitored, with a corresponding decrease in the response time. The successive code frames are generated continuously in a repetitious manner so that the status devices are constantly monitored. In order to ensure the proper timing of the pulses, each code window is divided into a "Toggle Subwindow" and a "Detect Subwindow". The relationship between windows is illustrated in the a timing diagrams of FIG. 2 showing device monitoring toggle and detection subwindows of events.

Figure 2:
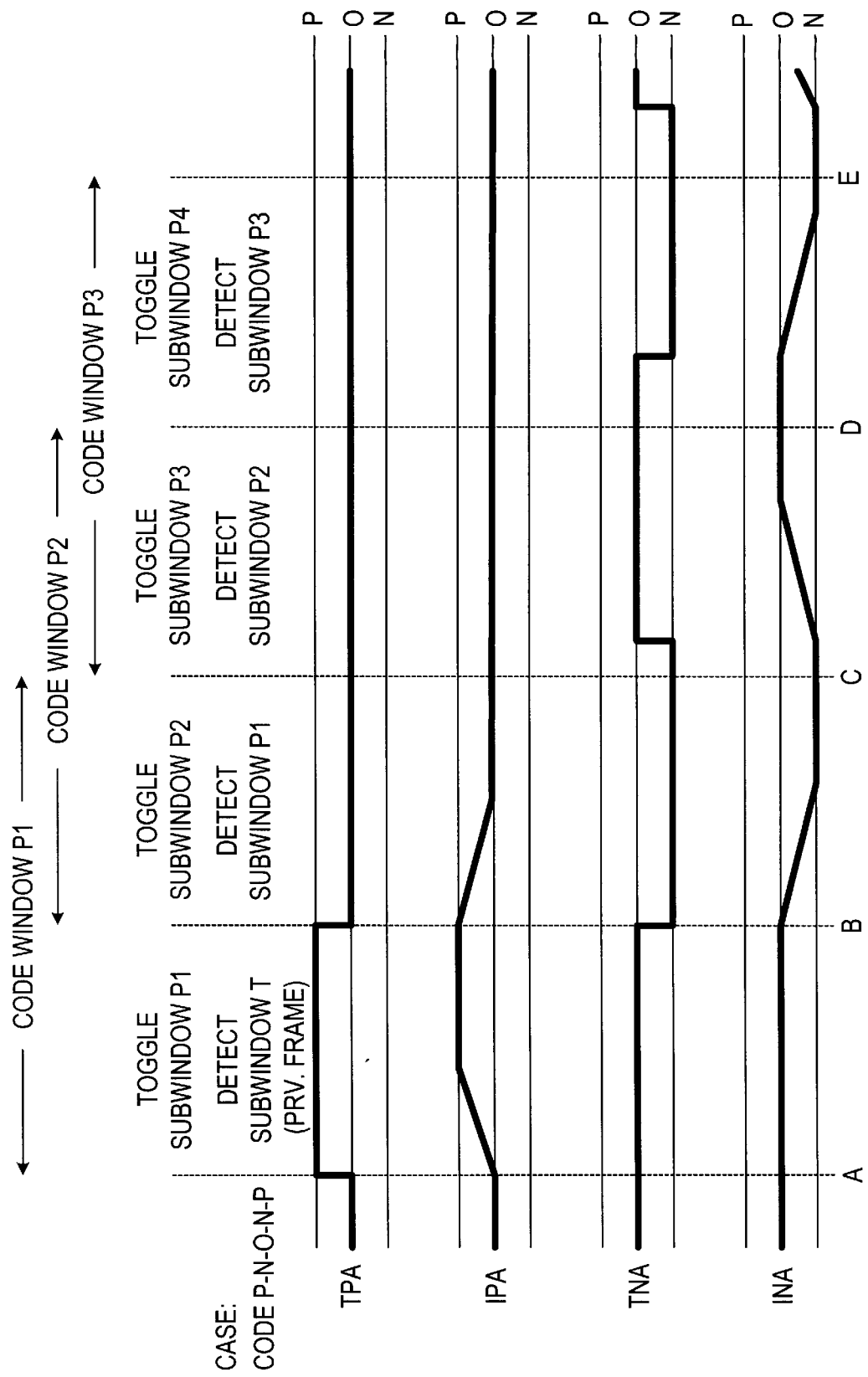
FIG. 2 is a timing diagram of device monitoring toggle and detection subwindows of component operation.

In FIG. 2, for code window P1, the output points are controlled to pulse on or off during the toggle subwindow, beginning at time "A". In order to compensate for the delay in signal propagation and to allow it to stabilize, detection for code window P1 occurs at the beginning of detect subwindow P1 at time "B". During the remainder of the detect subwindow P1, the output signal is permitted to return to its original (pre-toggle) state, which occurs by time "C".

It is to be noted that the detect subwindow for a given code window coincides with the toggle subwindow of the code window that follows it. This overlap reduces by a factor of two the number of code windows utilized for a code frame.

2.4.2: CODE GENERATION

The executive program generates the codes by controlling the output points in a precise manner. The P windows are produced by turning the positive output point on and the negative output point off. The N windows are produced by turning the negative output point on and the positive output point off. The O windows are produced by turning both the positive and negative output points off.

In the set of timing diagrams corresponding to a first device monitoring code shown in FIG. 3, in which the primary code is P-N-O-N-P (i.e. primary code length=5) and for which there are two secondary code windows and the tertiary code window. This corresponds to a code frame length of eight. The primary code windows are denoted by P1 through P5, the secondary windows by S1 and S2, and the tertiary window by T.

A second set of timing diagrams corresponding to a second device monitoring code are shown in FIG. 4, which illustrates a different example in which the primary code is N-O-O-P-P.

The secondary and tertiary codes are activated in the event of failure of checks for the primary codes as described in section 2.4.4. The characteristics of these, however, are the same as those of the primary codes.

2.4.3: CODE DETECTION

When the field device contact for a given circuit is closed, the corresponding primary code is received at the input points. It is detected by selectively examining the state of both the positive (IPA & IPB) and negative (INA, INB) points at the beginning of the corresponding detect subwindow and comparing these states to the predefined code pattern for the specific status circuit involved. If the device contact is open, no code is received.

The positive and negative pulses for each primary code are monitored separately. In FIGS. 3 and 4, primary codes of length equaling 5 are illustrated, with the primary codes of P-N-O-N-P and N-O-O-P-P shown in FIGS. 3 and 4, respectively. Referring to FIG. 3, the positive input is read and checked to be in the on state during code windows P1 and P5 and in the off state for code Windows P2, P3 and P4. The checking of both the on and off states ensures that neither the positive input nor the positive output is failed in either state. Similarly, the negative input is read and checked to be on during code windows P2 and P4, and off during code windows P1, P3 and P5. These checks are called the "Primary Positive Check" and the "Primary Negative Check" respectively. In Case A, both of the primary checks are successful. In Cases B, C and D, one of the primary checks has failed.

2.4.4: CODE INTERPRETATION 22.4.4.1: PRIMARY CODES

If both the primary positive check and the primary negative check described in Section 2.4.3 above for a given status circuit are successful, as in Case A in each of FIGS. 3 and 4, then it may be concluded with an extremely high probability that the device contacts being monitored are closed. This is true because all inputs and outputs are constantly checked in both the on and off states. While a failure of any of these may result in either a false on or a false off state, no such failure results in both a false on state and a false off state simultaneously. Furthermore, the success of these checks also validates the correctness of the wiring to the field device contacts because this wiring is the only path between the input points that generate the codes and output points that detect them.

2.4.4.2: SECONDARY CODES

In order to ensure reliability, the system is to be tolerant of a failure of any one of the input or output points. Because success of both the positive and negative checks have all four (positive and negative input, and positive and negative output) points be operative, the executive program reverts to a different mode of operation when a failure of these occurs.

If one, but not both the primary positive and is primary negative check is successful, it cannot be ascertained that the device contact being monitored is closed. This is because the positive primary checks alone, or the primary negative checks alone, for two different unique codes may be identical. For example, the positive primary check for code P-N-P-N-N examines the positive input point being on during windows P1 and P3, and off during windows P2, P4 and P5. The positive primary check for code P-O-P-O-N, a different code, is the same. The problem also exists if the positive input or output points fail, resulting in success of the primary negative check only.

This problem is addressed by activating one of the secondary code windows for a given monitoring circuit when one of the primary checks, but not both, has failed. When this occurs for a given status circuit and no failures are detected for any of the other monitoring circuits, secondary window S1 is activated for that circuit (and only that circuit) with a pulse of opposite polarity to that of the failure. This polarity is opposite to allow it to be generated and detected by the input/output point pair that is still operating. If the check for this in the corresponding detect subwindow is successful, then it, together with the success of the primary check, ensures the closure of the correct device contact. This condition is illustrated in Case B of both of FIGS. 3 and 4.

A subsequent failure in another status circuit activates the secondary code window S2. This condition is illustrated in Case C of both of FIGS. 3 and 4. It may be readily seen that the number of such failures that may be accommodated by this scheme is defined by the number of secondary code windows provided in the code frame for a particular system.

2.4.4.3: TERTIARY CODES

In order to provide for further reliability, failures beyond the capability of the secondary codes are handled by tertiary codes. As with the secondary codes, these are activated for a given circuit if one of the primary code checks has failed, and furthermore, only if no secondary code window is available for it. This condition is illustrated in case D of both of FIGS. 3 and 4.

As successive code frames are generated, they are numbered consecutively until the total number of status circuits is reached, each corresponding to a specific status circuit. When the last number is reached, the sequence is repeated. Given the example of a system with five circuits, five code frames numbered consecutively are generated. This process is then repeated continuously, creating "Code Cycles" of five code frames each.

While the primary and secondary codes for all status circuits may be active during every code frame, the tertiary code window for a given status circuit may only be activated during the one correctly numbered code frame of the above described code cycle. Similar to (and for the same reason as) the operation of the secondary code windows, the tertiary windows are activated and detected with a polarity opposite to that of the failure. If the check for this pulse is successful, this checking, together with the success of the one primary check, verifies the closure of the correct device contact.

The tertiary codes may accommodate any number of isolated input or output point failures, because of the dedication of specific code frames to the tertiary codes of each status circuit. The tradeoff of this benefit is in the response time to contact closure. While the circuits relying only on primary and/or secondary codes are checked once during each code frame, the checks for circuits relying on tertiary codes are only checked once for each code cycle. This corresponds to a time frame longer by a factor equal to the number of status circuits in the system.

FIG. 5 illustrates tertiary code operation through examples of three unique codes. Note that the tertiary code for status code 1 is only activated during code frame 1, that for status code 2 during code frame 2, etc.

2.4.5: VERIFICATION
2.4.5.1: CONTACT VERIFICATION

For device contact closure to be verified, the executive program enforces that one of the following combinations of code checks are to be true:

1. Primary positive check and primary negative check;
2. Primary positive check and any secondary check;
3. Primary negative check and any secondary check;
4. Primary positive check and tertiary check; and
5. Primary negative check and tertiary check.

2.4.5.2: DEVICE VERIFICATION

The executive program verifies that the device is in the active state by performing contact verifications as described in Section 2.4.5.1 above for each its two contacts independently, and ensuring that both verifications are true.

2.5: SYSTEM ROBUSTNESS

The robustness that results from the hardware design and embodiments thereof described in Section 2.3 and the executive program described in Section 2.4 is illustrated below by defining the combinations of discrete failures which are sustained before systemic failures result.

2.5.1: FAIL-SAFETY

There are two possible combinations of discrete failures that results in a wrong-side failure as follows:

1. if both of the two calculated points corresponding to the two contact verifications described in section 2.4.5.1 are in the false state; or
2. if, for both terminals, each of both contacts of a device are miswired to the corresponding input point pairs and to the corresponding output point pairs of another device.

2.5.2: RELIABILITY

There are two possible combinations of discrete failures that result in a right-side failure as follows:

1. if both the positive and negative input point for either contact fail; or
2. if both the positive and negative output point for either contact fail.

3.1: DEVICE CONTROL

The purpose of the illustrative embodiments disclosed herein is to control electrical devices in a manner which is both fail-safe and reliable. Devices are categorized as to whether their "safe" state (that in which safety is assured) is off or on. The following provisions apply to both "Safe-State-Off" and "Safe-State-On" devices, except where the section headings indicate applicability to one or the other.

In the disclosed illustrative embodiments, the devices are controlled by the presence or absence of electrical energy; i.e. that they attain only two operational states: off and on.

3.1.1: SAFE-STATE-OFF DEVICES

Safe-state-off devices are such that if failures are sustained which result in falsely attaining the off state, the impact is that the system of which they are a part remains safe. An example of such a device would be the green light on a traffic signal. If the green light were to fail in the off state when conditions dictate that it should be on, the result is safe. Conversely, if the same green light were to fail in the on state when conditions dictate that it should to be off, the result is unsafe.

3.1.2: SAFE-STATE-ON DEVICES

Safe-state-on devices are such that if failures are sustained which results in them falsely attaining the on state, the impact is that the system of which they are a part remains safe. An example of such a device would be the red light on a traffic signal. If the red light were to fail in the on state when conditions dictate that it should be off, the result is safe. Conversely, if the same red light were to fail in the off state when conditions dictate that it should be on, the result is unsafe.

3.2: THEORY

All application logic, which defines the desired state of a device based on current system-specific conditions, is executed twice in the MBC application program independently. The application logic uses the results of the disclosed fail-safe method for device monitoring as inputs. For each device therefore, two or four distinct internal "Calculated" points (four in the case of a bipolar device) are provided which reflect the result of the application logic. The states of the calculated points are in turn used to drive the control circuits of the disclosed method for device control.

Each device is controlled by either by four or eight solid state relays (SSRs) arranged as two or four redundant pairs that are, in turn, controlled by their corresponding calculated points. One of these pairs switches the positive energy to one terminal of the device, while another pair switches the negative energy to the other terminal. Devices that are polarity sensitive (reversible, or "bipolar", which is defined herein as being reversible) are provided with a second set of output points and SSRs to switch the energy of the opposite polarity.

The integrity of the input and output points and of the SSRs is ensured by continuously checking whether they have failed in either state. This is accomplished by first checking the off state, and then the on state of each SSR. When necessary (when the calculated state does not match the state being checked), the SSR is "toggled" to the opposite state. Therefore, regardless of the state of the calculated point for a given output at a given time, both states are checked continuously. Because any combination of the input and output points and solid state relays may fail in either the off or on states, but not both the off and on states simultaneously, these checks are capable of verifying that they have not failed in either state. Furthermore, the integrity of the specific physical wiring of each device is ensured by performing similar checks that are unique for each device by using that wiring as its electrical path.

3.2.1: SAFE-STATE-OFF DEVICES

Because both the positive and negative energy are to be present for the device to attain the on state, switching either of them off results in the device attaining the off (safe) state. Therefore, if it is determined that at least one of the SSR pairs has not failed, then the device may be controlled to the off state. The presence or absence of both the positive and negative energy is detected by two sets of positive and negative input points, one set being connected to each terminal of the device. In this manner, the presence or absence of both the positive and negative controlling energy is fed back to the MBC.

In the unlikely event that both the positive and negative output points or SSRs falsely attains the on state, two "conditioned Busses", one positive and one negative, are provided. These busses, which supply power to all safe-state-off devices, are arranged in series with the respective SSR contacts. They are de-energized by contactors if such failures occur, interrupting energy to all safe-state-off devices, and thereby ensuring that they attaining the off state.

3.2.2: SAFE-STATE-ON DEVICES

Energy to the terminals of a device is controlled by four SSRs, two for each terminal wired in parallel. Therefore, if any SSR fails in the on state, the result is safe, and the device continues to operate. If any SSR fails in the off state, energy continues to be controlled by its other SSR pair member, so the device continues to operate. If both members of an SSR pair were to fail in the off state, the result would be unsafe. If this condition is detected, two "Inverse Conditioned Busses", one positive and one negative, are provided. These busses are arranged in parallel to the respective SSR contacts. They are energized by contactors if such failures occur, supplying energy to all safe-state-on devices, and thereby ensuring that they attaining the on state.

3.3: HARDWARE DESIGN AND ILLUSTRATIVE EMBODIMENTS THEREOF

3.3.1: SAFE-STATE-OFF DEVICES

Figure 6:
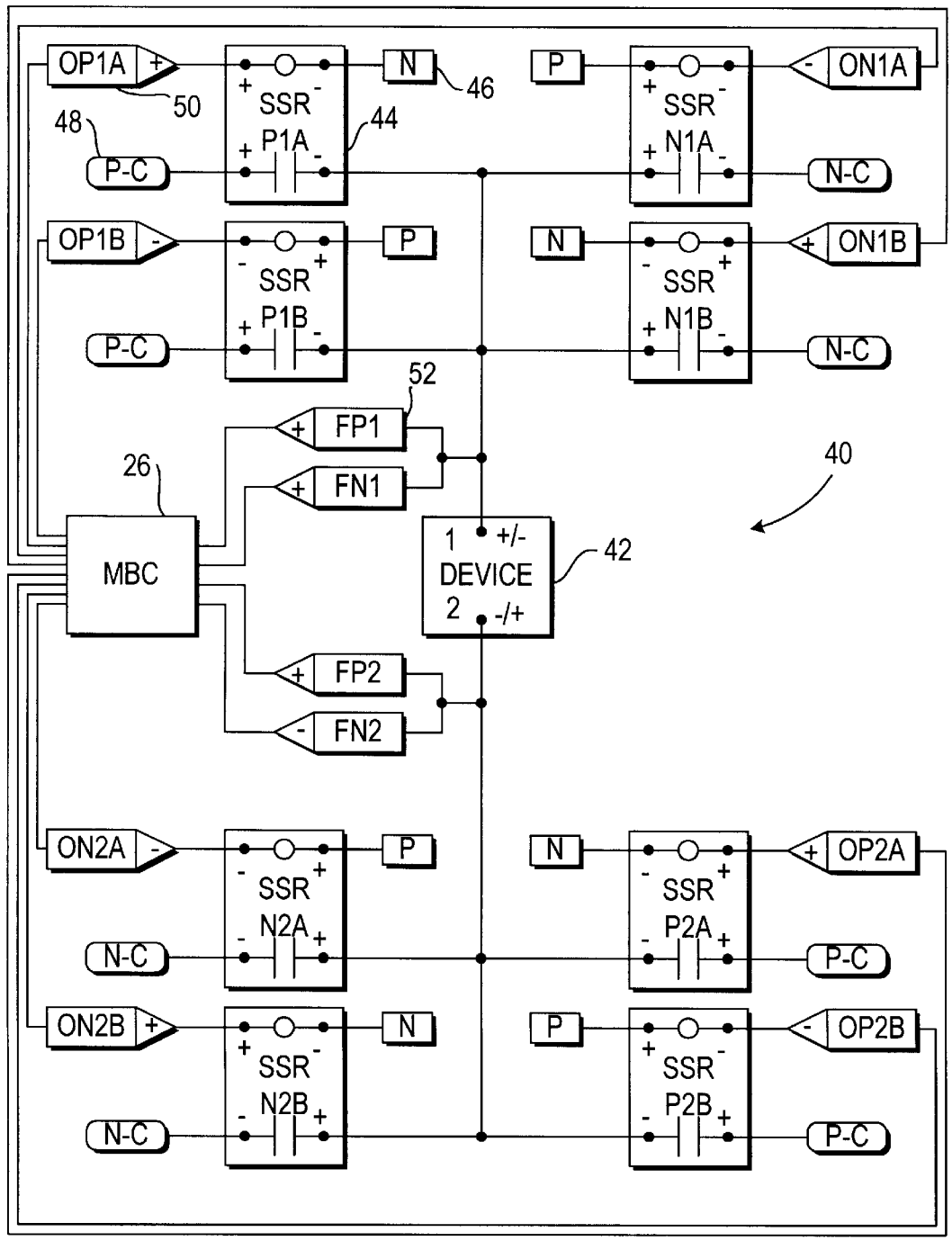
FIG. 6 is a schematic diagram of the disclosed fail-safe system configured for control of a safe-state-off bipolar device.
Figure 7:
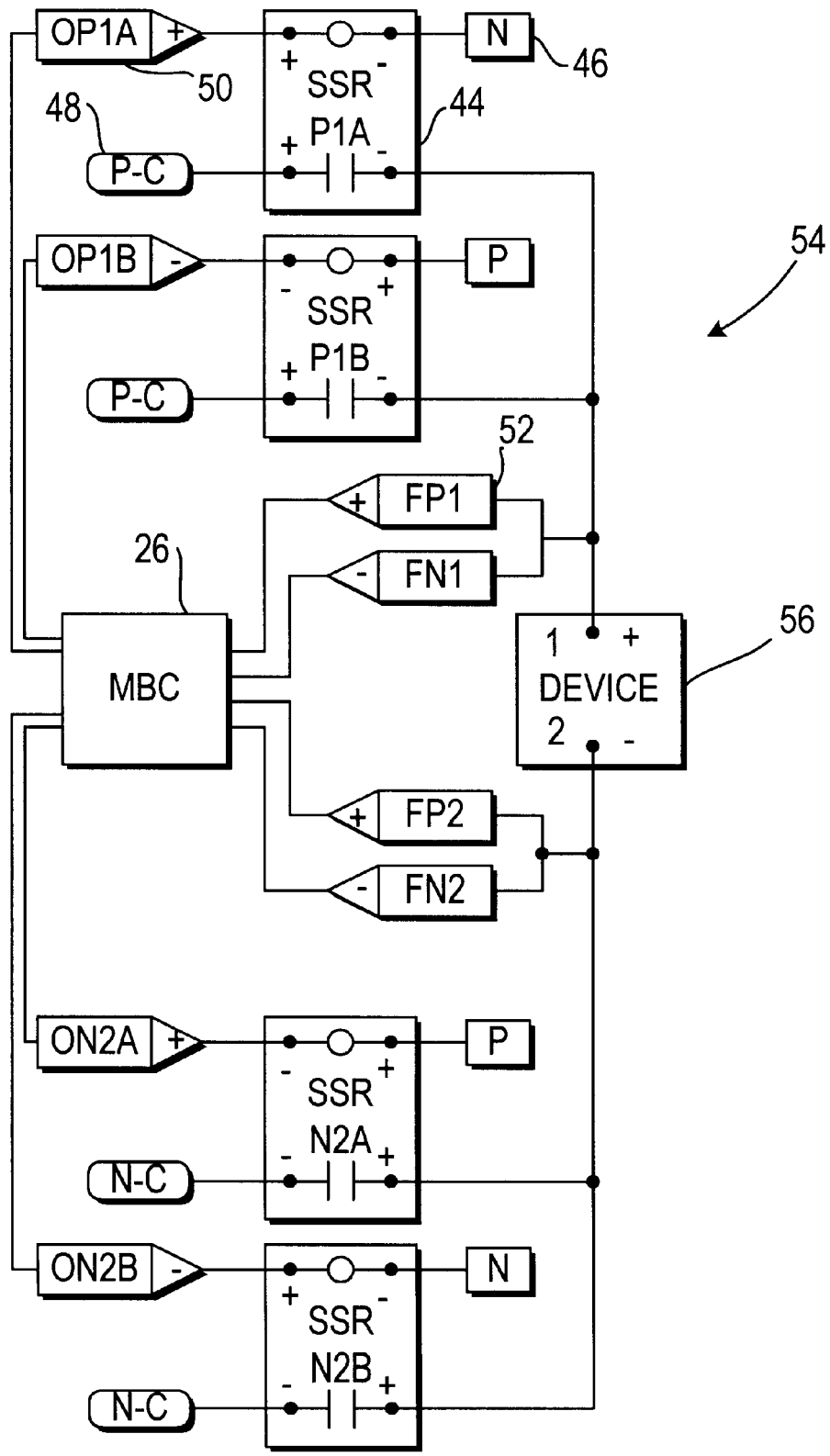
FIG. 7 is a schematic diagram of the disclosed fail-safe system configured for control of a safe-state-off unipolar device.

The disclosed fail-safe system for the control of safe-state-off devices is shown in illustrative embodiments in FIGS. 6–7.

A configuration 40 is shown in FIG. 6 having the MEC 26 connected to a bipolar device 42 through various elements, as described below, such as a solid-state relay (SSR) 44 connected to primary busses such as the bus 46 labelled N, as well as to condition busses such as bus 48 labelled P-C. The MBC 26 is connected to the SSRs 44 and to the device 42 through input and output points 50, 52.

For example, the device 42 may be a bipolar device, such as a reversible motor.

An alternative configuration 54 is shown in FIG. 7 having a device 56 such as a unipolar device (for example, a lamp) operatively connected to the MBC 26 through various components. The term T "unipolar" is defined herein to include a device not polarity sensitive.

3.3.1.1: CIRCUITRY

In the bipolar application shown in FIG. 6, each device is controlled by four pairs solid state relays, P1A and P1B, N1A and N1B, P2A and P2B, and N2A and N2B. The P1 SSRs control the positive energy to device terminal 1. The N1 SSRs control the negative energy to device terminal 1. The P2 SSRs control the positive energy to device terminal 2. The N2 SSRs control the negative energy to device terminal 2. The two members (A and B) of each of these pairs are wired in parallel so as to provide redundancy in the event one fails. The SSRs are controlled by output points OP1A, OP1B, ON1A, ON1B, OP2A, OP2B, ON2A and ON2B respectively. Note that OP1A, ON1B, ON2B and OP2A are positive switching points, which may optionally include current sourcing points, while OP1B, ON1A, ON2A and OP2B are negative switching points, which may optionally include current sinking points, which ensures that in the event of a failure of all output points of a given type in the MBC, one of the two solid state relays controlling the positive or the negative energy to the device remains controllable.

The source of power that controls the device, which is routed over, or in series with, the solid state relay contacts, is conditioned busses P-C and N-C. These provide the function of removing power from all safe-state-off devices in the event of failures of the SSRs that would otherwise be unsafe.

The solid state relays provide power amplification to the devices. The presence or absence of this energy at each terminal is detected by two pairs of two input points, positive and negative points FP1 and FN1, and positive and negative points FP2 and FN2, one of each of these sets being connected to each terminal.

Unipolar applications, such as the illustrative embodiment shown in FIG. 7, are a subset of the bipolar applications. Because the need to switch polarity is not employed for unipolar applications, SSRs N1A, N1B, P2A and P2B and their associated circuitry and output points may be eliminated.

3.3.1.2: CONDITIONED BUSSES

Figure 8:
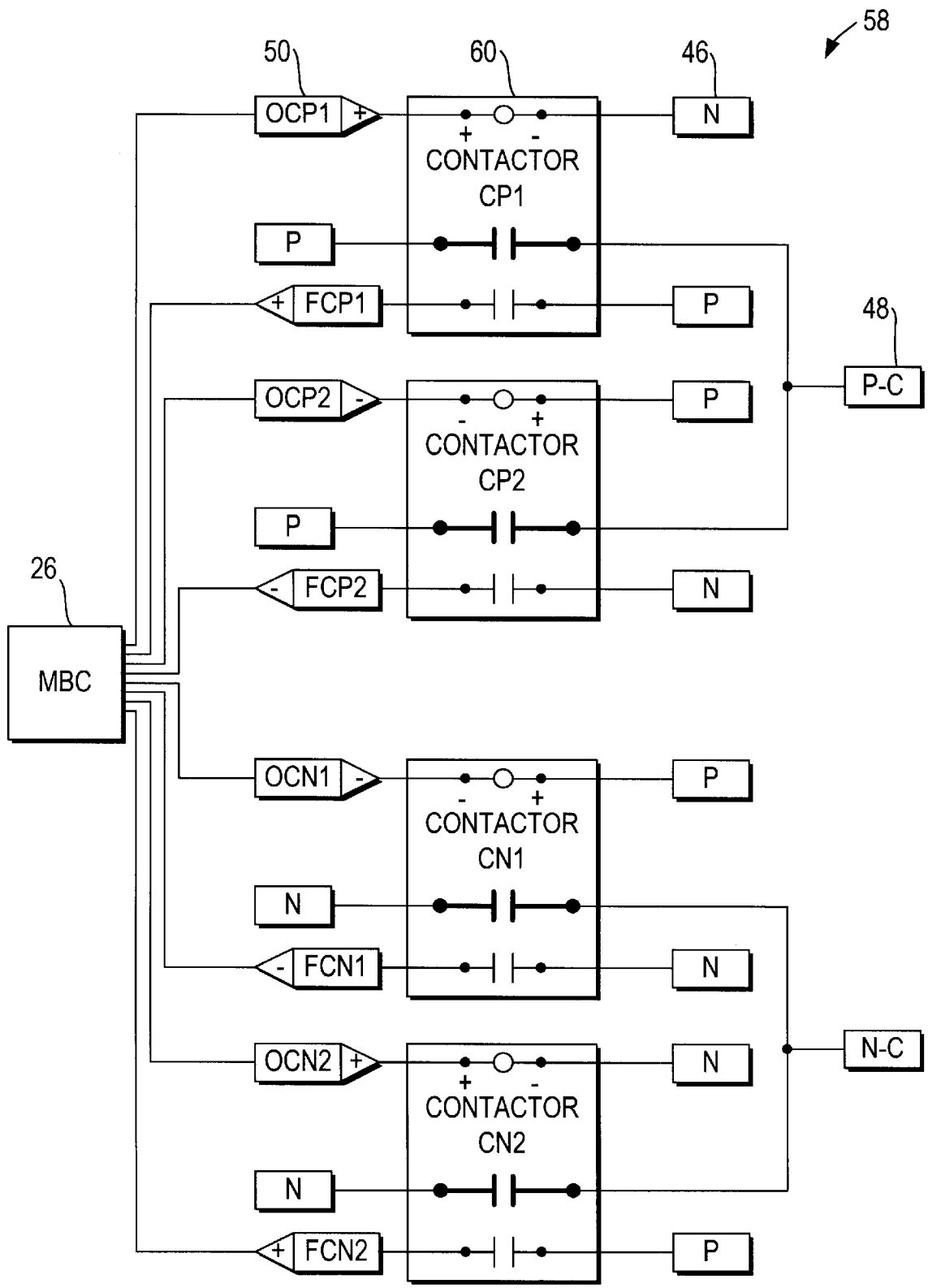
FIG. 8 is a schematic diagram of the disclosed fail-safe system configuration for conditioned busses.

The hardware design and illustrative embodiments thereof for the conditioned busses is shown in FIG. 8 for an illustrative configuration 58. The positive and negative conditioned busses are P-C and N-C respectively. For example, bus 48, labelled P-C, is energized by primary bus, P, via the main closed-when energized contacts of contactors CP1 and CP2 in parallel, such as contactor 60 labelled CP1. Bus N-C is energized by primary bus 46, labelled N., via the main contacts of contactors CN1 and CN2 in parallel.

Control of the contactors by the MBC 26 is provided by output points OCP1, OCP2, OCN1 and OCN2, such as output point 50 labelled OCP1, with each output point controlling their respective contactors. Note that OCP1 and OCN2 are positive switching points, which may optionally include current sourcing points, while OCP2 and OCN1 are negative switching points, which may optionally include current sinking points. This is to ensure that in case of failure of all output points of a given type in the MBC, one of the contactors controlling bus P-C and one controlling bus N-C remains operational.

The states of the contactors are detected by the MBC via input points FCP1, FCP2, FCN1 and FCN2. Note that FCP1 and FCN2 are positive sensing points, which may optionally include current sinking points, while FCP2 and FCN1 are negative sensing points, which may optionally include current sourcing points. This is to ensure that in the event of a failure of all input points of a given type in the MBC, one of the contactors controlling bus P-C and one controlling bus N-C remain monitored.

3.3.2: SAFE-STATE-ON DEVICE

3.3.2.1: CIRCUITRY

Figure 9:
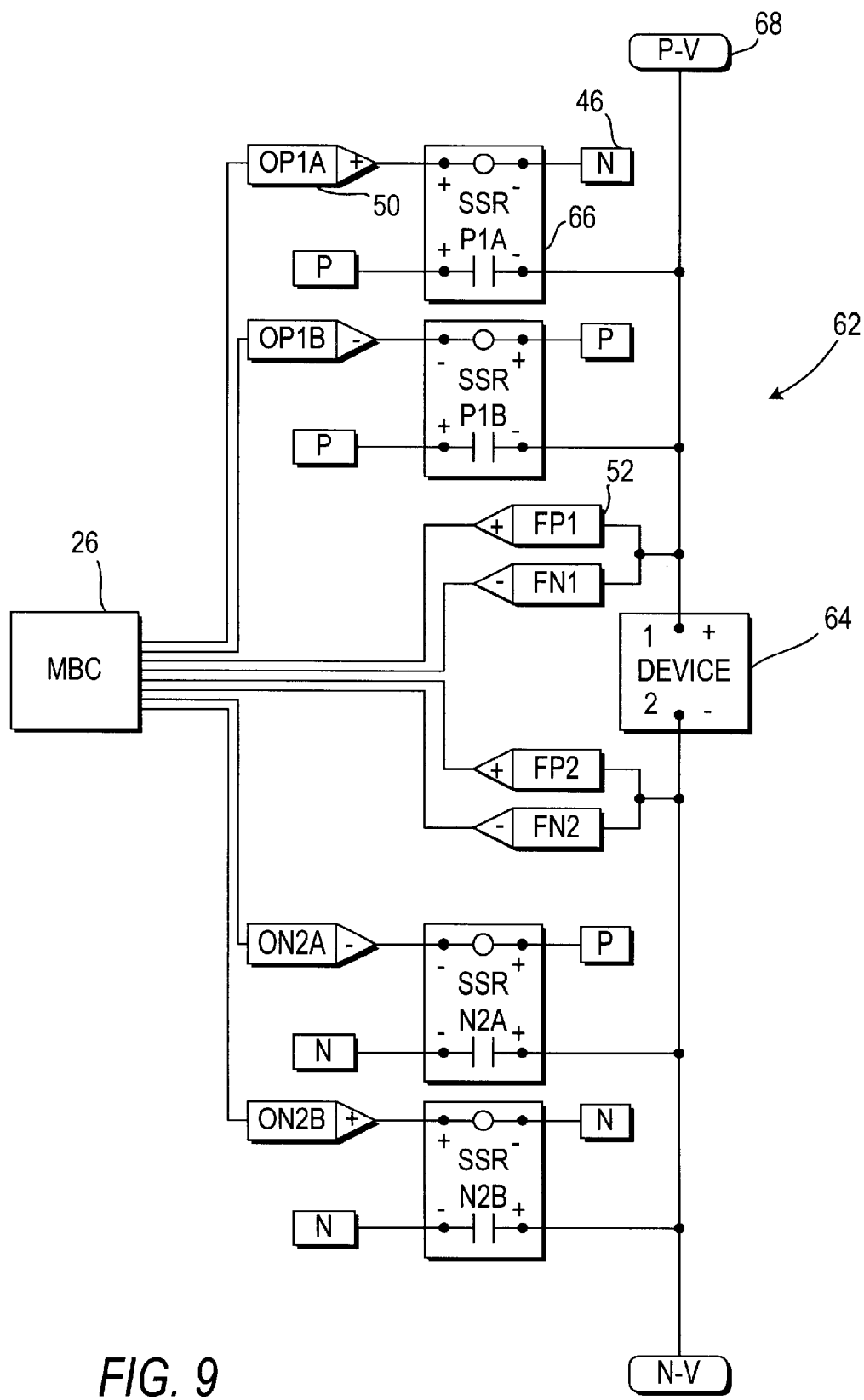
FIG. 9 is a schematic diagram of the disclosed fail-safe system configured for control of a safe-state-on device.

An illustrative embodiment 62 of the hardware design of the disclosed fail-safe system for the control of safe-state-off devices 64 is shown in FIG. 9 for an illustrative configuration 62. The configuration 62 of the fail-safe system is similar to that for unipolar safe-state-off devices, and includes SSRs such as SSR 66. The primary difference is that the inverse conditioned busses P-V and N-V, such as inverse bus 68 labelled P-V, are substituted for the conditioned busses. These are arranged in parallel to the corresponding SSR contacts rather than in series with them. This provides the capability to supply the devices with power regardless of the state of the SSRs, ensuring that they may be turned on.

3.3.2.2: INVERSE CONDITIONED BUSSES

Figure 10:
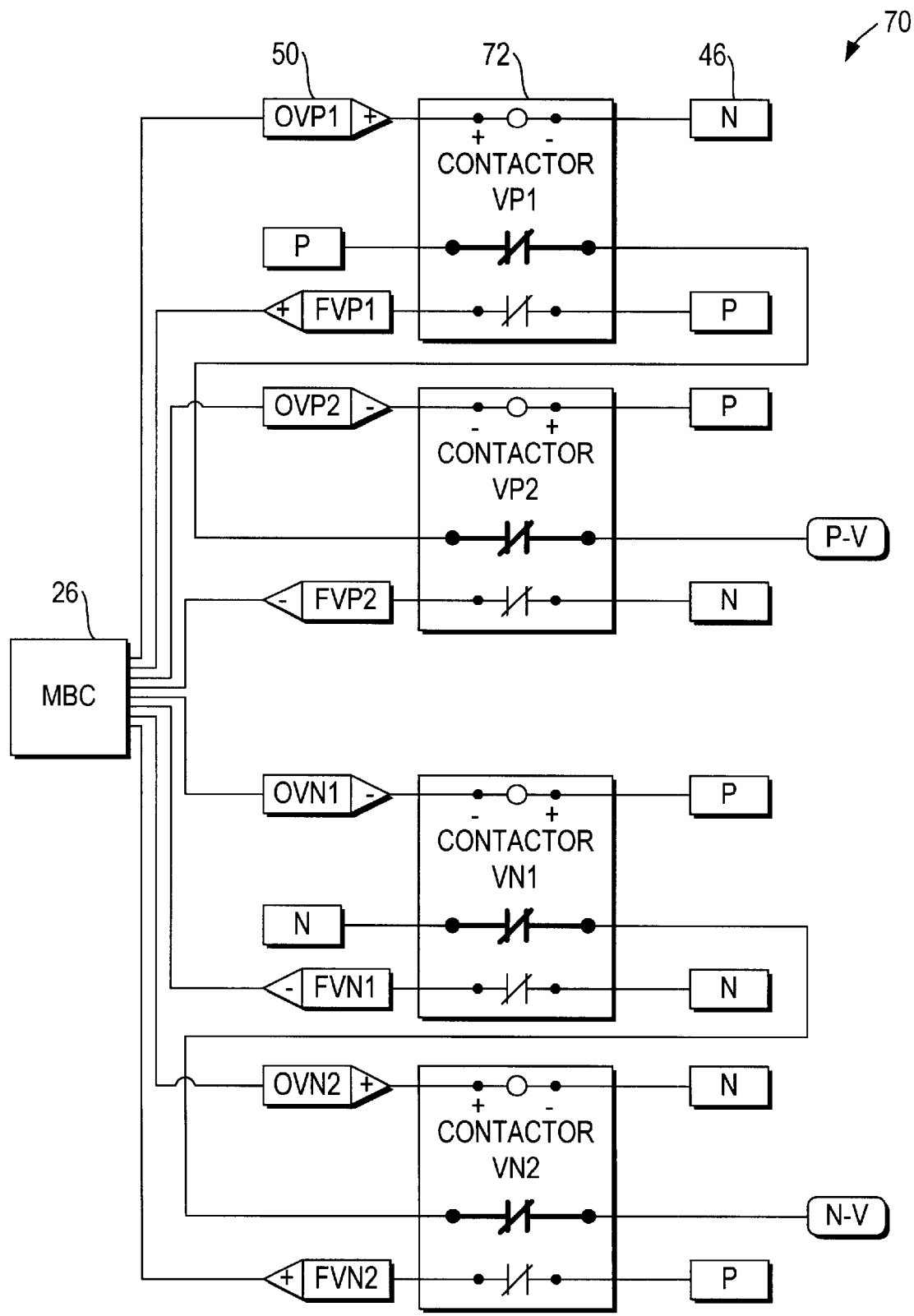
FIG. 10 is a schematic diagram of the disclosed fail-safe system configuration for inverse conditioned busses.

The hardware design and illustrative embodiments thereof of the disclosed fail-safe system for the inverse conditioned busses is shown in an illustrative configuration 70 in FIG. 10 having contactors such as contactor 72. The operation of this embodiment of the disclosed fail-safe system 24 are similar to that for the conditioned busses described in section 3.3.1.2, with differences as described below. The positive and negative inverse conditioned busses are PV and NV respectively, and are controlled by contactors VP1 and VP2, and VN1 and VN2 respectively. The contacts of contactors VP1 and VP2 are arranged in series, rather than in parallel, as are those of contactors VN1 and VN2. The corresponding MBC output points controlling the contactors are OVP1, OVP2, OVN1 and OVN2. The corresponding MBC input points are FVP1, FVP2, FVN1 and FVN2.

3.4: PROGRAM

3.4.1: APPLICATION LOGIC

The application program is responsible for ensuring that all the application logic defined by users for all devices is executed twice, and that the resulting pairs of calculated points are applied in the control of the SSRs controlling positive energy to one device terminal and negative energy to the other device terminal respectively.

3.4.2: DEVICE INTEGRITY

The executive program is responsible for performing the actions necessary to verify the integrity of the device control circuits. This is accomplished via "Checks" and "Verifications" by which the ability to drive an SSR to both states is ascertained.

3.4.2.1: CHECKS

All checks are performed continuously, repetitively, and in a particular sequence. The timing and sequencing structure under which checks are performed is called a "Check Frame". Each check frame includes a number of "Test Windows" during which individual "Tests" are performed. Each check includes two such tests: an "Off State Test" and an "On State Test". In this manner, both device states are tested regardless of the current state of the device. Each test window, in turn, includes two "Subwindows": a "Toggle Subwindow" and a "Detect Subwindow". During the toggle subwindow the SSR is forced to the off or on state, whichever is being tested. The feedback that the state attains is ascertained during the detect subwindow, which immediately follows the corresponding toggle subwindow.

Each check frame contains 20 checks: 16 "Universal Checks", U1 through U16, and four "Wiring Checks", W1 through W4. The universal checks correspond to the eight device SSRS, each of which is checked via two input points. All corresponding SSRS, for example all P1A SSRS, for all devices are checked simultaneously during a universal check. During each check frame, one device is enabled for wiring checks that verify the integrity and correctness of the wiring to that device. In this manner, wiring checks are performed on successive devices one at a time. There are only four rather than 16 wiring checks in each check frame because SSR pairs, e.g., N2A and N2B are checked together, and only one of the two input points may serve for wiring verification. It therefore has as many check frames as there are devices to complete all wiring checks. Such a group of check frames is a "Check Cycle".

3.4.2.1.1: TEST WINDOW STRUCTURE AND OPERATION

Figure 11:
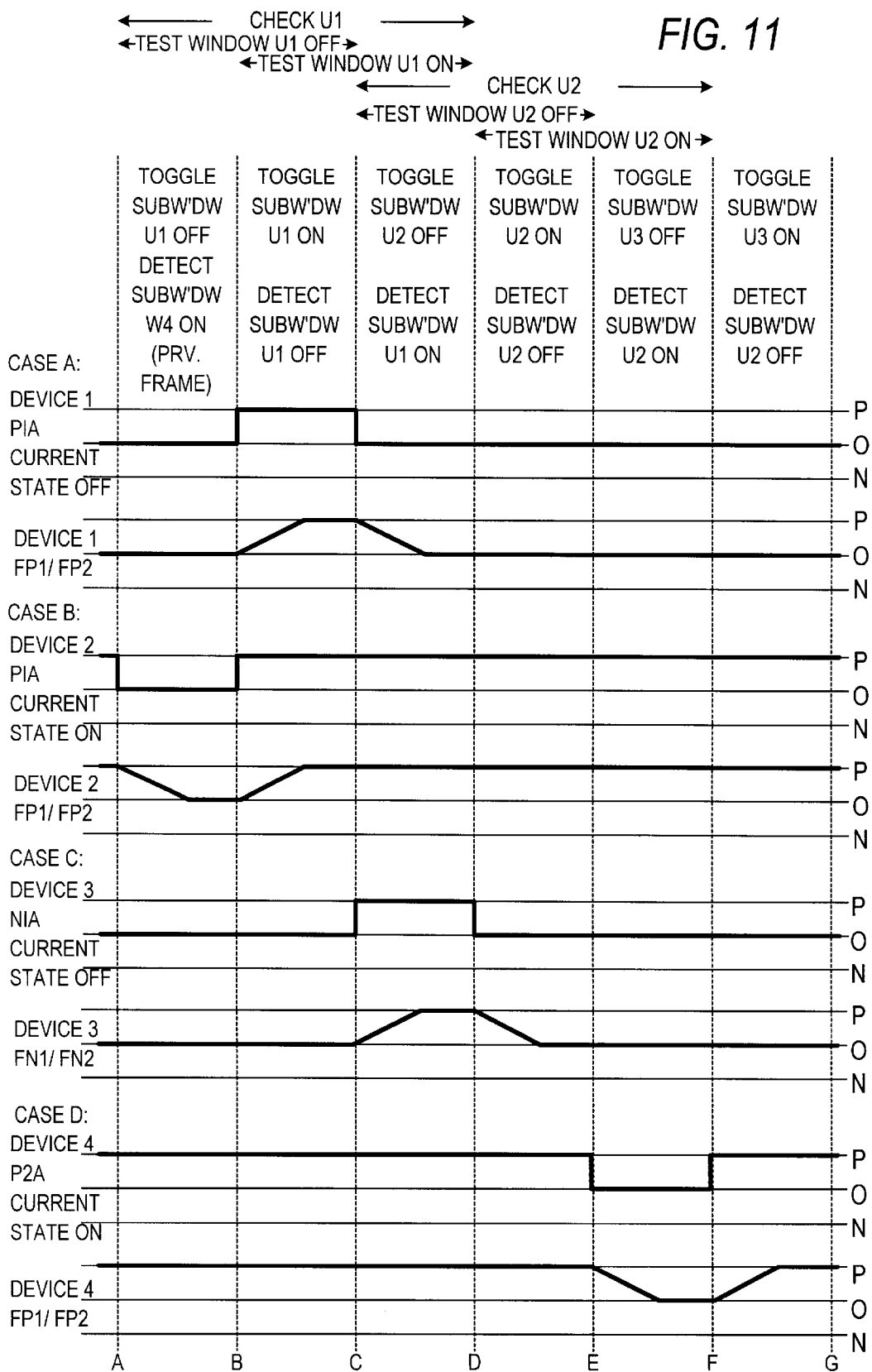
FIG. 11 depicts a set of timing diagrams illustrating device control check and test windows.

The structure and operation of the check windows is illustrated in FIG. 11. To perform a given test, the output circuits are controlled to the desired state during the toggle subwindow. In Case A, SSR P1A of device 1, whose current state is off, is turned on at time "A", which is at the beginning of its toggle subwindow. Between times "A" and "B", the transition of state is allowed to stabilize, which happens by time "B", the end of the toggle subwindow. Time "B" is also the beginning of the detect subwindow, at which time the input point is read to verify the expected change in state. Case B, C and D illustrate the tests for other SSRs of other devices with different current states.

It is to be noted that the detect subwindow for a given check window coincides with the toggle subwindow of the check window that follows it. This overlap reduces by a factor of two the number of check windows used for a check frame.

3.4.2.1.2: CHECK FRAME STRUCTURE

Table 1 below is an illustrative sequence of test windows and checks in a check frame:

TABLE 1

| Sub-window | Check Name | SSR | Check via Input Point: | Test State | Device Continuity Checked? |
|---|---|---|---|---|---|
| 1 | U1 | P1A | FP1 | Off | No |
| 2 | U1 | P1A | FP1 | On | No |
| 3 | U2 | P1A | FP2 | Off | Yes |
| 4 | U2 | P1A | FP2 | On | Yes |
| 5 | U3 | N1A | FN1 | Off | No |

TABLE 1-continued

| Sub-window | Check Name | SSR | Check via Input Point: | Test State | Device Continuity Checked? |
|---|---|---|---|---|---|
| 6 | U3 | N1A | FN1 | On | No |
| 7 | U4 | N1A | FN2 | Off | Yes |
| 8 | U4 | N1A | FN2 | On | Yes |
| 9 | U5 | P2A | FP2 | Off | No |
| 10 | U5 | P2A | FP2 | On | No |
| 11 | U6 | P2A | FP1 | Off | Yes |
| 12 | U6 | P2A | FP1 | On | Yes |
| 13 | U7 | N2A | FN2 | Off | No |
| 14 | U7 | N2A | FN2 | On | No |
| 15 | U8 | N2A | FN1 | Off | Yes |
| 16 | U8 | N2A | FN1 | On | Yes |
| 17 | U9 | P1B | FP1 | Off | No |
| 18 | U9 | P1B | FP1 | On | No |
| 19 | U10 | P1B | FP2 | Off | Yes |
| 20 | U10 | P1B | FP2 | On | Yes |
| 21 | U11 | N1B | FN1 | Off | No |
| 22 | U11 | N1B | FN1 | On | No |
| 23 | U12 | N1B | FN2 | Off | Yes |
| 24 | U12 | N1B | FN2 | On | Yes |
| 25 | U13 | P2B | FP2 | Off | No |
| 26 | U13 | P2B | FP2 | On | No |
| 27 | U14 | P2B | FP1 | Off | Yes |
| 28 | U14 | P2B | FP1 | On | Yes |
| 29 | U15 | N2B | FN2 | Off | No |
| 30 | U15 | N2B | FN2 | On | No |
| 31 | U16 | N2B | FN1 | Off | Yes |
| 32 | U16 | N2B | FN1 | On | Yes |
| 33 | U17 | P1A, P1B | FP2 | Off | Yes |
| 34 | U17 | P1A, P1B | FP2 | On | Yes |
| 35 | U18 | N1A, N1B | FN2 | Off | Yes |
| 36 | U18 | N1A, N1B | FN2 | On | Yes |
| 37 | U19 | P2A, P2B | FP1 | Off | Yes |
| 38 | U19 | P2A, P2B | FP1 | On | Yes |
| 39 | U20 | N2A, N2B | FN1 | Off | Yes |
| 40 | U20 | N2A, N2B | FN1 | On | Yes |

3.4.2.2: VERIFICATIONS

If both the current state test and the converse state test for a given check are successful, then it may safely be deduced that the corresponding SSR has not failed in either state and that it remains under the control of the MBC processor.

Universal check verifications are performed once per check frame for all devices, and are therefore run at very short intervals. This enables rapid detection of and response to failures. Wiring verifications, in contrast, are performed only once per check cycle, and are therefore run at longer intervals.

3.4.2.2.1: UNIVERSAL VERIFICATIONS

Verifications for all universal checks are performed to determine their success. For each of these, two separate verifications are performed, one via each of two different input points. Given the case of solid state relay P1A, one verification is made via input point FP1 and the other via input point FP2. These input points are involved because they monitor positive energy, which is of the same polarity as that switched by the SSRS. SSR P1A is verified as not having failed if either of the two (FP1 or FP2) verifications is successful. It is also to be noted that, the verification via input point FP2, in addition to verifying the operation of SSR P1A, also verifies device continuity (not failed open) because the device includes part of the circuit path.

3.4.2.2.2: WIRING VERIFICATIONS

The correctness of the wiring of devices to the microprocessor-based controller is verified by additional check windows in a check frame. Taking advantage of the fact that some of the universal verifications described in section 3.4.3.1 also verify the circuit path, similar verifications, called "wiring Verifications", are employed to ensure this. This is accomplished by dedicating one check frame of a check cycle to each device. Wiring checks for a given device are only performed during its assigned check frame, ensuring that checks may only be successfully completed if both the generation and detection of those checks are associated with the same device.

Figure 12:
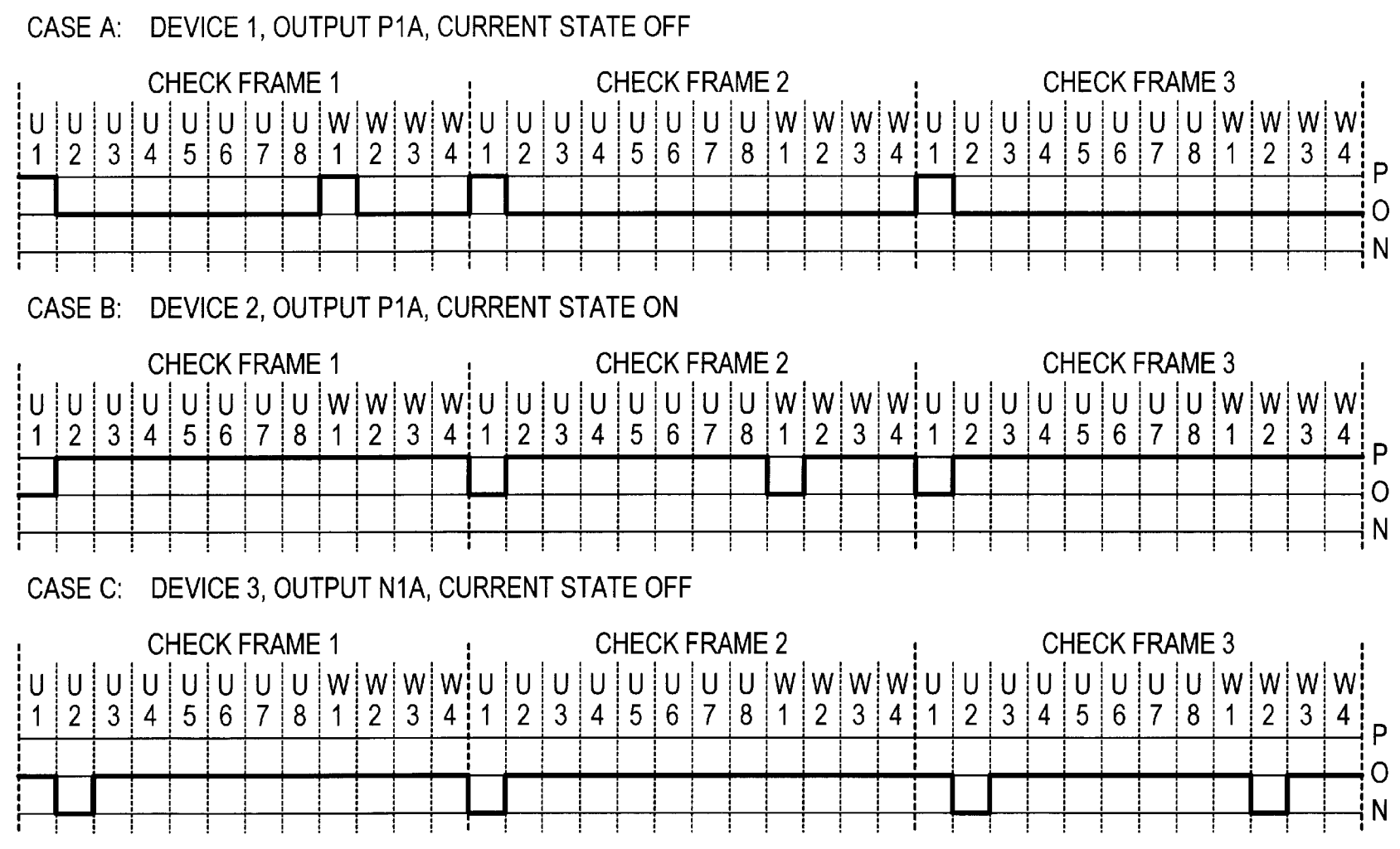
Figure 12:
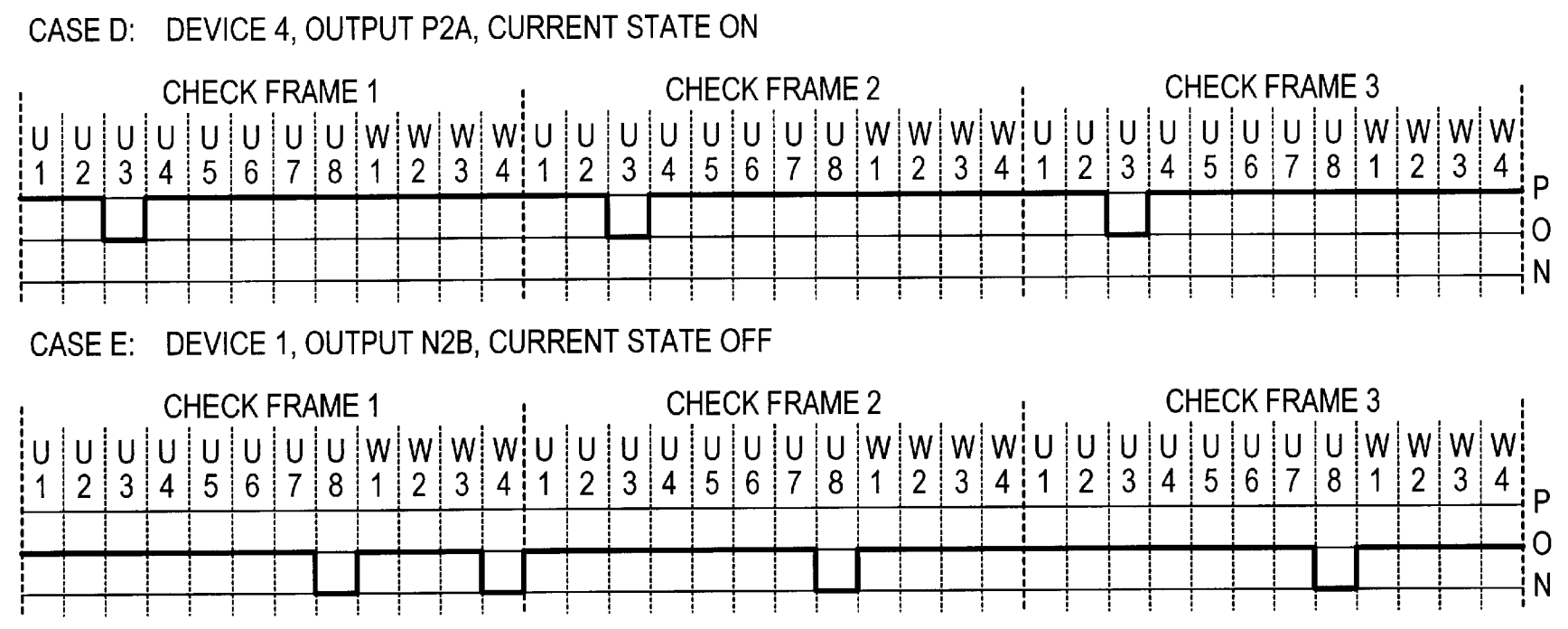

The sequencing and utilization of wiring checks within a check cycle is illustrated in FIG. 12, which includes five cases A through E. These cases illustrate various examples of check activation (including universal checks) and current states. Note that the wiring checks for a given device are only activated during the correspondingly numbered check frame.

3.4.3: FAILURE CONDITION OPERATION
3.4.3.1: UNIVERSAL CHECK FAILURES
3.4.3.1.1: SAFE-STATE-OFF DEVICES

The hardware design and illustrative embodiments thereof of the disclosed fail-safe system provide that at least two SSRs, one positive and one negative, are to be closed in order to energize a device. Therefore if one SSR fails, device fail-safety is maintained if it is known that the universal checks for both of the SSRs controlling the energy of the opposite polarity to the opposite device terminal are verified. For example, if the universal check for SSR N2A has failed, no further action is needed to ensure fail-safety only if the universal checks for both SSRs P1A and P1B are verified. If these criteria are not met, the "Global Failure State" is set, the conditioned busses are de-energized and the inverse conditioned busses are energized as described in sections 3.4.4.1 and 3.4.4.2 respectively.

3.4.3.1.2: SAFE-STATE-ON DEVICES

The hardware design and illustrative embodiments thereof of the disclosed fail-safe system provide that either member two SSR pairs is capable of supplying power to each of the two corresponding device terminals. If one of these pair members should fail in either state, device control is maintained. Therefore, if the universal checks for at least one member of each pair, P1A or P1B, and, N2A or N2B, are verified, no further action is performed to ensure fail-safety. If these criteria are not met, the "Global Failure State" is set, the conditioned busses are de-energized, and the inverse conditioned busses are energized as described in sections 3.4.4.1 and 3.4.4.2 respectively.

3.4.3.2: WIRING CHECK FAILURES

If a wiring check is detected during a check frame other than that assigned to a device, then it is concluded that the SSR which originated it does not correspond to the input point at which it was received. This condition may only arise if a device has been miswired. If this occurs, the device is set to "Miswired" status. This status may only be reset upon the verification of any one of the four possible wiring checks.

3.4.3.2.1: SAFE-STATE-OFF DEVICES

Miswired status for a safe-state-off device "forces" both of its calculated points to the off state. This ensures safety because while it is not known to which device the miswiring has occurred, it suffices to turn the associated SSRs off, thereby ensuring that whatever device is actually connected are also off. If, for example the positive SSRs for device "X" are miswired to device 37 Y", the wiring checks for both devices fail. Device X's positive SSRs interrupts the positive energy to device Y due to the miswiring, while device Y's own negative SSRs, which are not miswired, interrupts the negative energy.

3.4.3.2.2: SAFE-STATE-ON DEVICES

Miswired status for a safe-state-on device "forces" both of its calculated points to the on state. This ensures safety in a manner similar to that for safe-state-off devices as describe in section 3.4.3.2.1, except that energy is supplied rather than interrupted.

3.4.4: BUS CONTROL

When the global failure state described in sections 3.4.3.1.1 and 3.4.3.1.2 is set, failures are such that the conditioned and inverse conditioned busses are operated to change their states of energization so as to ensure fail-safety. Both of these bus sets are controlled by the executive program to operate in tandem. The normal state is for the conditioned busses to be energized and for the inverse conditioned busses to be de-energized. Under the global failure state, the states of both sets of busses are changed: the conditioned busses are de-energized and the inverse conditioned busses are energized. This illustrates the inverse relationship between the two sets of busses. As a result, the conditioned and inverse conditioned busses are always in opposing states of energization, except as described below for global failure reset purposes.

3.4.4.1: CONDITIONED BUSSES

Under the global failure state, the executive program de-energizes all four contractors (CP1, CP2, CN1 and CN2), which in turn de-energizes conditioned busses, P-C and N-C.

When the failures causing the global failure have been cleared, the executive program provides for the automatic resetting of this status by energizing the contactors for the positive bus (P-C) and the negative bus (N-C) one at a time. This provides an opportunity for the universal checks to be re-verified while continuing to ensure that the devices are not energized. Only if the universal checks performed to clear the global failure state are re-verified are the four contactors be re-energized.

3.4.4.2: INVERSE CONDITIONED BUSSES

Under the global failure state, the executive program de-energizes all four contractors (VP1, VP2, VN1 and VN2), which in turn energizes inverse conditioned busses, P-V and N-V.

When the failures causing the global failure have been cleared, the executive program provides for the automatic resetting of this status by energizing the contactors for the positive bus (P-V) and the negative bus (N-V) simultaneously, and for intervals only long enough to span a complete check frame. This provides an opportunity for the universal checks to be re-verified while continuing to ensure that the devices are subject to possible false de-energization for a correspondingly short interval. The four contactors are re-energized only if the universal checks performed to clear the global failure state are re-verified.

3.4.4.3: CONTACTOR INTEGRITY

The integrity of the contactors that control the conditioned busses and the inverse conditioned buss is also checked by the executive program to ensure that the failure of a given contactor does not compromise the ability to control bus energy to the devices.

The method by which this is accomplished is by momentarily de-energizing each contactor one at a time and verifying this de-energization by monitoring the associated input points FCP1, FCP2, FCN1 and FCN2 (for the conditioned bus contactors), and FVP1, FVP2, FVN1 and FVN2 (for the inverse conditioned bus contactors), which are controlled via auxiliary contactor contacts. In this manner, bus energy to the devices is not affected. For the conditioned busses, at least one of the two contactor contacts controlling each bus are closed at any given time, ensuring that device energy is not interrupted. For the inverse conditioned busses, at least one of the two contactors contacts controlling each bus are open at any given time, ensuring that device energy is not supplied.

The executive program checks that a change of state in the associated input points has occurred before contactor integrity is verified, thereby ensuring that the contactor actually de-energized.

Contactor integrity is checked periodically so that failures may be quickly diagnosed and rectified. This is of particular importance given the role that the contactors play in with respect to fail safety.

3.5: SYSTEM ROBUSTNESS

The robustness that results from the illustrative embodiments described in section 3.3 and the program described in section 3.4 is illustrated below by defining the combinations of discrete failures which is sustained before systemic failures result.

3.5.1: FAIL-SAFETY
3.5.1.1: SAFE-STATE-OFF DEVICES

There are three possible combinations of discrete failures that result in a wrong-side failure in a safe-state-off device as follows:

1. If one of the two SSRs controlling positive energy to one device terminal, and, one of the two SSRs controlling negative energy to the other terminal of the same device, and, one of the two contactors controlling the positive conditioned bus, and, one of the two contactors controlling the negative conditioned bus, all fail in the on/energized state;
2. The independent application logic for both of the two calculated points of a device is executed incorrectly; or
3. If both terminals of a device are miswired each to the corresponding two SSR pairs of another device.

3.5.1.2: SAFE-STATE-ON DEVICES

There are four possible combinations of discrete failures that result in a wrong-side failure in a safe-state-on device as follows:

1. If both of the two SSRs controlling positive energy to one device terminal and both of the two contactors controlling the positive inverse conditioned bus all fail in the off/de-energized state;
2. If both of the two SSRs controlling negative energy to one device terminal and both of the two contactors controlling the negative inverse conditioned bus all fail in the off/de-energized state;
3. The independent application logic for both of the two calculated points of a device is executed incorrectly; or
4. If both terminals of a device are miswired each to the corresponding two SSR pairs of another device.

3.5.2: RELIABILITY
3.5.2.1: SAFE-STATE-OFF DEVICES

In an illustrative embodiment, there are seven possible combinations of discrete failures that result in a right-side failure in a safe-state-off device as follows, which are categorized according to whether they result in systemic failures of individual devices or of all such devices:

FOR INDIVIDUAL DEVICES:
1. If both SSRs controlling the positive energy to a device terminal fail in the off state.
2. If both SSRs controlling the negative energy to a device terminal fail in the off state.
3. If any single device terminal has been miswired.
4. If multiple unrelated device terminals have been miswired.

FOR ALL DEVICES:
5. If both the positive and negative universal checks for any device as described in section 3.4.4.1.1 have failed.
6. If both of the positive conditioned bus contactors fail in the de-energized state.
7. If both of the negative conditioned bus contactors fail in the de-energized state.

3.5.2.2: SAFE-STATE-ON DEVICES

There are six possible combinations of discrete failures that result in a right-side failure in a safe-state-on device as follows, which are categorized according to whether they result in systemic failures of individual devices or of all such devices:

FOR INDIVIDUAL DEVICES:
1. If either SSR controlling the positive energy to a device terminal fails in the on state, and either SSR controlling the negative energy to a device terminal fails in the on state.
2. If any single device terminal has been miswired.
3. If multiple unrelated device terminals have been miswired.

FOR ALL DEVICES:
4. If both the positive and negative universal checks for a given device as described in section 3.4.4.1.2 have failed.
5. If both of the positive inverse conditioned bus contactors fail in the energized state.
6. If both of the negative inverse conditioned bus contactors fail in the energized state.

4: OPERATION

In use, the disclosed fail-safe system including the various embodiments thereof as described above, operate generally according to the fail-safe method described below with reference to FIGS. 13–14.

4.1: DEVICE MONITORING

Figure 13:
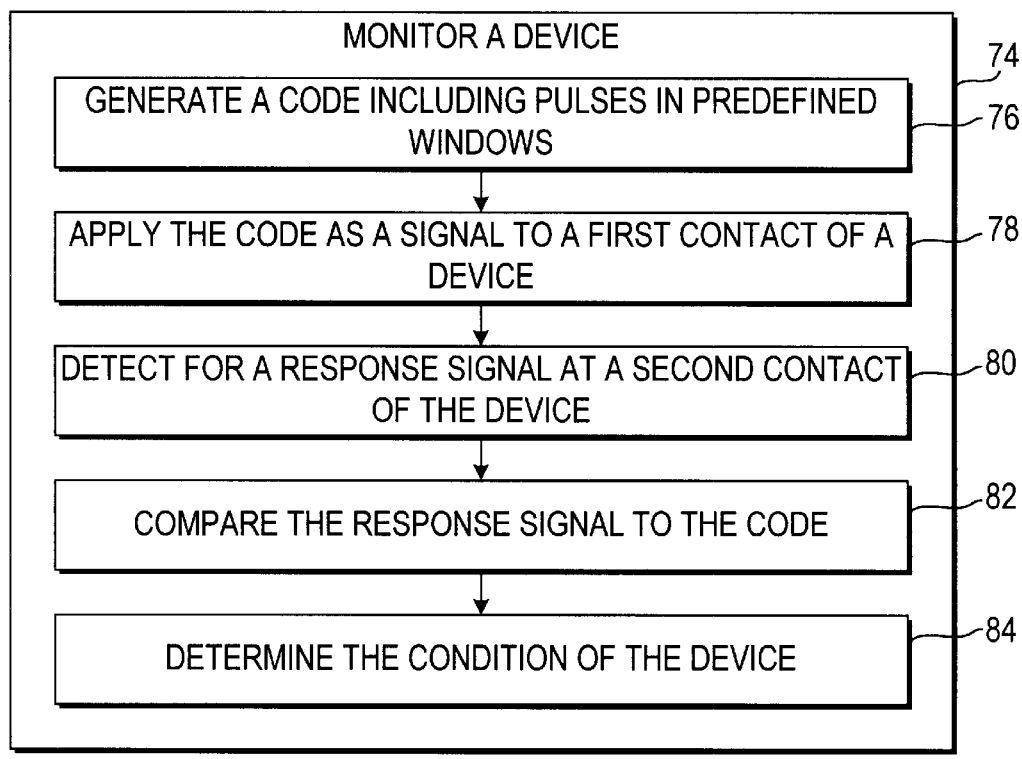
FIGS. 13–14 depict two flowcharts illustrating the operation of the disclosed fail-safe system and method for device monitoring and device control, respectively.

As shown in FIG. 13, the fail-safe system disclosed herein monitors a device in step 74, as described in Section 2 above, including the steps of generating a code including pulses in predefined windows in step 76, applying the code as a signal to at least a first contact of a device in step 78, and detecting for a response signal at a second contact of the device in step 80. The generation of the code includes generating primary codes, as described, for example, in Section 2.4.4.1 above, as well as generating secondary codes, as described, for example, in Section 2.4.4.2 above, and generating tertiary codes, as described, for example, in Section 2.4.4.3 above.

Upon detecting the response signal, the fail-safe system compares the response signal to the code in step 82, and determines a condition of the device in step. 84.

4.2: DEVICE CONTROL

Figure 14:
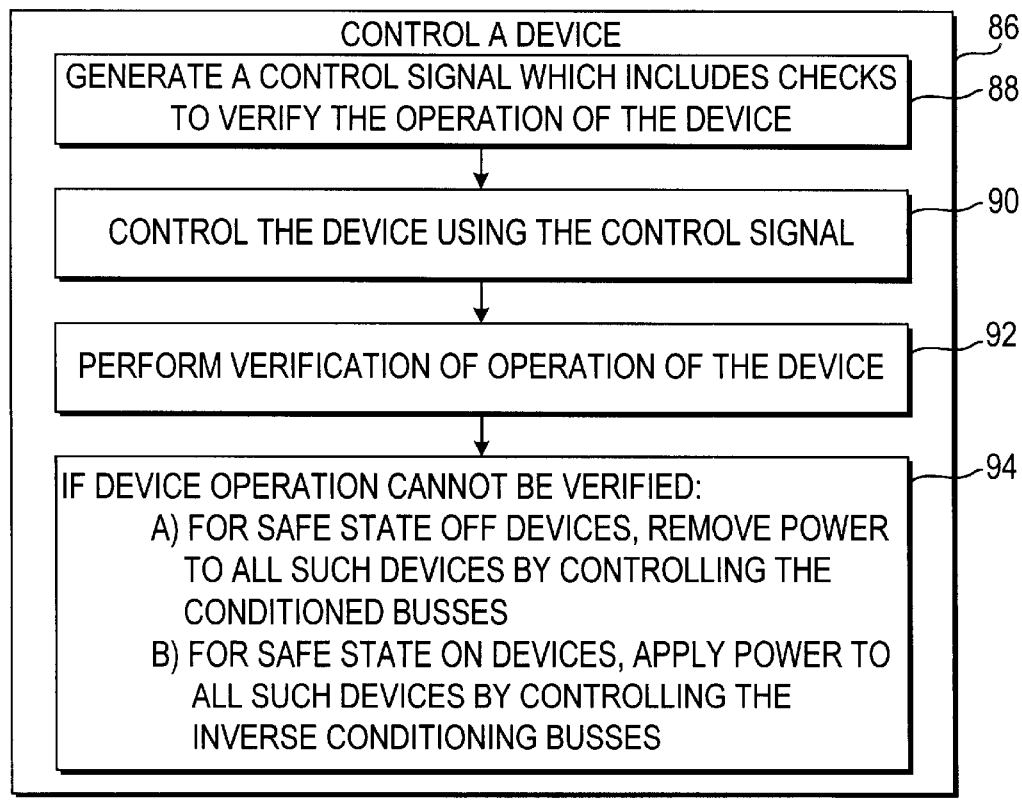

As shown in FIG. 14, the fail-safe system also controls a device in step 86, as described in Section 3 above, including the steps of generating a control signal that include checks to verify the operation of the device in step 88, controlling the device using the control signal in step 90, performing a verification of the operation of the device in step 92 in response to the controlling of the device, and operating the conditioned and inverse conditioned power busses in step 94 if such verification is not obtained. Such operation of the conditioned and inverse conditioned power busses includes:

a) for safe state off devices, remove power to all such devices by controlling the conditioned busses; and
b) for safe state on devices, apply power to all such devices by controlling the inverse conditioned busses.

While the disclosed fail-safe system and method have been particularly shown and described with reference to the preferred embodiments, it is understood by those skilled in the art that various modifications in form and detail may be made therein without departing from the scope and spirit of the invention. For example, the methods described for monitoring and control of devices as shown in FIGS. 13–14, respectively, may be used independently or alternatively in conjunction with each other. Accordingly, modifications such as those suggested above, but not limited thereto, are to be considered within the scope of the invention.

What is claimed is:

1. A fail-safe system for monitoring of at least one device, each of said at least one device having at most two pairs of positive and negative output points and at most two pairs of positive and negative inputs, said fail-safe system comprising:

a processor, operating using a program, for generating a primary code comprising at least one predefined interval of time during which a first input signal is positive in polarity and at least another predefined interval of time during which the first input signal is negative in polarity, for applying the primary code to the output points, for detecting a first response signal at the input points, and for comparing the first response signal with the primary code to detect an active state of said at least one device, wherein the processor generates at least one secondary code, each of said at least one secondary code comprising a predefined interval of time selected from the group consisting of: a predefined interval of time during which a second input signal is positive in polarity and a predefined interval of time during which a second input signal is negative in polarity, said at least one secondary code being generated in response to the failure of components of said at least one device selected from the group consisting of: at least one input point and at least one output point, the processor applies said at least one secondary code to the output points, the processor detects a second response signal at the input points, and the processor compares the second response signal with said at least one secondary code to detect an active state of said at least one device.

2. The fail-safe system of claim 1, wherein the processor generates a tertiary code comprising a predefined interval of time selected from the group consisting of: a redefined interval of time during which a third input signal is positive in polarity and a predefined interval of time during which a third input signal is negative in polarity, said tertiary code being generated in response to the failure of components of said at least one device selected from the group consisting of: a plurality of input points and a plurality of output points, said plurality of input points and said plurality of output points being greater in number than a number of failures of the components of said at least one device which the secondary code is able to detect, the processor applies said tertiary code to the output points, the processor detects a third response signal at the input points, and the processor compares the third response signal with said tertiary code to detect an active state of said at least one device.

3. The fail-safe system of claim 2, wherein the primary code, the secondary code, and the tertiary code further determine whether the wiring and interconnection of said at least one device is correct.

4. The fail-safe system of claim 2, wherein each of said at least one device has two pairs of positive and negative output points and two pairs of positive and negative input points, each of said at least one device having two independent circuits allowing the processor to apply the primary code, the secondary code, and the tertiary code and allowing the processor to detect the first response signal, the second response signal, and the third response signal to detect an active state of said at least one device.

5. The fail-safe system of claim 4, wherein the two independent circuits each provide an input to two independent and functionally identical instances of application logic.

6. A fail-safe system for monitoring at least one device, said fail-safe system comprising, for each such device:

at most two pairs of positive and negative output points connected to input signals to the device;

at most two pairs of positive and negative input points connected to receive signals from the device; and a processor, operating using a program, for generating a primary code comprising a series of three-state digits, each of said digits having a state selected from the group consisting of a first state corresponding to a direct current pulse of positive polarity, a second state corresponding to a direct current pulse of negative polarity and a third state corresponding to an absence of both the direct current pulse of positive polarity and the direct current pulse of negative polarity, said primary code comprising at least one digit having the first state and one digit having the second state, said processor further being for applying the primary code to said output points and for detecting a first response signal at said input points, said processor further being for comparing the first response signal with the primary code to detect an active state of the device.

7. The fail-safe system of claim 6, wherein said processor further generates at least one secondary code comprising another series of the three-state digits in response to a failure at at least one of said output points and said input points, each secondary code including at least one digit having one of the first and second states, said processor applying the at least one secondary code to said output points, detecting a second response signal at the input points and comparing the second response signal with the at least one secondary code to detect the active state of the device.

8. The fail-safe system of claim 7, wherein said processor further generates a tertiary code comprising another series of the three-state digits in response to a failure at a first plurality of said output points or at a second plurality of said input points, wherein at least one of the first plurality and the second plurality is greater in number than a number of failures which use of the at least one secondary code is able to detect, the tertiary code including at least one digit having one of the first and second states, said processor applying the tertiary code to said output points, detecting a third response signal at the input points and comparing the third response signal with the tertiary code to detect the active state of the device.

9. The fail-safe system of claim 8, wherein the primary code, the at least one secondary code and the tertiary code further determine whether a connection of said fail-safe system to the device is correct.

10. The fail-safe system of claim 8, wherein each device has two independent circuits, said processor applying the primary code, the at least one secondary code and the tertiary code to inputs for the two independent circuits and detecting the first response signal, the second response signal and the third response signal at outputs from the two independent circuits.

11. The fail-safe system of claim 10, wherein the two independent circuits each provide an input to two independent and functionally identical instances of application logic.

12. A fail-safe system for controlling at least one device, the device being of a type having at least a first terminal and a second terminal and having a safe state that is an off state of the device, said fail-safe system comprising, for each such device:

first control circuitry comprising at least one independent positive control circuit for the first terminal of the device;

second control circuitry comprising at least one independent negative control circuit for the second terminal of the device, said first and second control circuitry together comprising at most a pair of independent positive and negative control circuits for each of the first and second terminals of the device, where each said positive control circuit comprises at least one positive energy output point for outputting positive energy to a respective terminal of the device and two positive energy input points for inputting positive energy from a respective terminal of the device, and each said negative control circuit comprises at least one negative energy output point for outputting negative energy to a respective terminal of the device and two negative energy input points for inputting negative energy from a respective terminal of the device; and means for causing the device to attain its off state through an independent removal of either the positive or negative energy from the device.

13. The fail-safe system of claim 12, further comprising a processor programmed to perform verification checks to verify proper operation of said control circuits by using a control circuit ensemble including at least one said positive control circuit and at least one said negative control circuit, and by using at least one pair of said positive and negative energy input points.

14. The fail-safe system of claim 13, wherein said processor is programmed to perform verification checks to determine whether a connection of said fail-safe system to the device is correct.

15. The fail-safe system of claim 12, wherein the at least one pair of positive and negative control circuits for each of the first and second terminals are controlled respectively by two calculated points.

16. The fail-safe system of claim 15, wherein states of said two calculated points are determined, respectively, by two independent and functionally identical instances of application logic.

17. The fail-safe system of claim 12, wherein said means for causing the device to attain its off state comprises at least one positive conditioned bus and at least one negative conditioned bus, the off state being attained by deenergization of said conditioned busses.

18. The fail-safe system of claim 12, wherein each of said control circuits includes a solid-state relay.

19. The fail-safe system of claim 12, wherein each said positive control circuit comprises two positive output points and each said negative control circuit comprises two negative output points, said fail-safe system further comprising means for ensuring proper control of the device in response to failure of one of said positive and negative output points.

20. A fail-safe system for controlling at least one device, the device being of a type having at least a first terminal and a second terminal and having a safe state that is an on state of the device, said fail-safe system comprising, for each such device:

first control circuitry comprising at least one independent positive control circuit for the first terminal of the device;

second control circuitry comprising at least one independent negative control circuit for the second terminal of the device, where each said positive control circuit comprises at least one positive energy output point for outputting positive energy to a respective terminal of the device and two positive energy input points for inputting positive energy from a respective terminal of the device, and each said negative control circuit comprises at least one negative energy output point for outputting negative energy to a respective terminal of the device and two negative energy input points for inputting negative energy from a respective terminal of the device; and means for causing the device to attain its on state through an independent application of both the positive and negative energy to the device.

21. The fail-safe system of claim 20, further comprising a processor programmed to perform verification checks to verify proper operation of said control circuits by using a control circuit ensemble including at least one positive control circuit and at least one negative control circuit, and by using at least one pair of said positive and negative energy input points.

22. The fail-safe system of claim 21, wherein said processor is programmed to perform verification checks to determine whether a connection of said fail-safe system to the device is correct.

23. The fail-safe system of claim 20, wherein the at least one pair of positive and negative control circuits for each of the first and second terminals are controlled respectively by two calculated points.

24. The fail-safe system of claim 23, wherein states of said two calculated points are determined, respectively, by two independent and functionally identical instances of application logic.

25. The fail-safe system of claim 20, wherein said means for causing the device to attain its on state comprises at least one positive inverse conditioned bus and at least one negative inverse conditioned bus, the on state being attained by energization of said inverse conditioned busses.

26. The fail-safe system of claim 20, wherein each of said control circuits includes a solid-state relay.

27. The fail-safe system of claims 20, wherein each said positive control circuit comprises two positive output points and each said negative control circuit comprises two negative output points, said fail-safe system further comprising means for ensuring proper control of the device in response to failure of at least one of said positive and negative output points.

* * * * *